United States Patent
Takeda et al.

(10) Patent No.: US 12,363,642 B2
(45) Date of Patent: Jul. 15, 2025

(54) TRANSMITTING OVERLAPPING UPLINK TRANSMISSIONS USING A POWER SCALING FACTOR

(71) Applicant: QUALCOMM Incorporated, San Diego, CA (US)

(72) Inventors: Kazuki Takeda, Tokyo (JP); Peter Gaal, San Diego, CA (US); Timo Ville Vintola, San Diego, CA (US); Juan Montojo, San Diego, CA (US); Gokul Sridharan, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 17/811,218

(22) Filed: Jul. 7, 2022

(65) Prior Publication Data

US 2023/0100655 A1    Mar. 30, 2023

Related U.S. Application Data

(60) Provisional application No. 63/261,926, filed on Sep. 30, 2021.

(51) Int. Cl.
*H04W 52/34* (2009.01)
*H04W 52/14* (2009.01)
(Continued)

(52) U.S. Cl.
CPC ......... *H04W 52/146* (2013.01); *H04W 52/28* (2013.01); *H04W 52/367* (2013.01)

(58) Field of Classification Search
CPC .. H04W 52/146; H04W 52/28; H04W 52/367
(Continued)

(56) References Cited

U.S. PATENT DOCUMENTS 10,383,067 B2*   8/2019   Lin et al. ............ H04W 52/367
                                                  52/365
10,917,855 B2*   2/2021   Park et al. .......... H04W 52/146
                                                  52/325
(Continued)

FOREIGN PATENT DOCUMENTS

WO       2015116866 A1      8/2015

OTHER PUBLICATIONS

R1-142047, "UL Power Control and Power Scaling for Dual Connectivity"; Alcatel-Lucent Shanghai Bell, Alcatel-Lucent, 3GPP TSG RAN WG1 Meeting #77, Seoul, Republic of Korea, May 19-23, 2014 (Year: 2014).*

(Continued)

*Primary Examiner* — Christopher M Crutchfield
*Assistant Examiner* — Syed Ahmed
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may transmit, to a network node, a first uplink transmission using a first transmit power that is based at least in part on: a first power level associated with the first uplink transmission, and a power scaling factor based at least in part on a power offset. The UE may transmit, to the network node, a second uplink transmission, at least partially overlapping in time with the first uplink transmission, using a second transmit power that is based at least in part on: a second power level associated with the second uplink transmission, a maximum available transmit power, and the first transmit power. Numerous other aspects are described.

30 Claims, 20 Drawing Sheets

(51) Int. Cl.
*H04W 52/16* (2009.01)
*H04W 52/28* (2009.01)
*H04W 52/36* (2009.01)

(58) Field of Classification Search
USPC .......................................................... 370/522
See application file for complete search history.

(56) References Cited

U.S. PATENT DOCUMENTS

| | | | |
|---|---|---|---|
| 11,252,678 B2* | 2/2022 | Pelletier et al. | H04W 52/367 52/28 |
| 11,516,743 B2* | 11/2022 | Rahman et al. | H04W 52/146 7/456 |
| 11,540,227 B2* | 12/2022 | Molavian Jazi et al. | H04W 52/146 52/367 |
| 2012/0188947 A1 | 7/2012 | Larsson et al. | |
| 2013/0058315 A1 | 3/2013 | Feuersanger et al. | |
| 2020/0245257 A1* | 7/2020 | Pelletier et al. | H04W 52/146 52/343 |

OTHER PUBLICATIONS

R1-141737, "UL Power Control and Power Scaling/Splitting for Dual Connectivity", 3GPP TSG RAN WG1 Meeting #76bis Shenzhen, China, Mar. 31-Apr. 4, 2014 (Year: 2014).*
R1-120486, "Power scaling for simultaneous transmissions of multiple UL channels with multiple TA groups", Alcatel-Lucent Shanghai Bell, Alcatel-Lucent, 3GPP TSG RAN WG1 Meeting #68, Dresden, Germany, Feb. 6-10, 2012 (Year: 2012).*
International Search Report and Written Opinion—PCT/US2022/075148—ISA/EPO—Nov. 30, 2022.

* cited by examiner

700

| $P_{req\_UL1}$ (dBm) | $P_{req\_UL2}$ (dBm) | $P_{UL1}$ (dBm) | $P_{UL2}$ (dBm) |
|---|---|---|---|
| 23 | 23 | 21.24 | 18.24 |
| 23 | 22 | 21.54 | 17.54 |
| 23 | 21 | 21.81 | 16.81 |
| 23 | 20 | 22.03 | 16.03 |
| 23 | 19 | 22.21 | 15.21 |
| 23 | 18 | 22.36 | 14.36 |
| 23 | 17 | 22.49 | 13.49 |
| 23 | 16 | 22.59 | 12.59 |
| 22 | 23 | 20.88 | 18.88 |
| 22 | 22 | 21.24 | 18.24 |
| 22 | 21 | 21.54 | 17.54 |
| 22 | 20 | 21.81 | 16.81 |
| 22 | 19 | 22 | 16.13 |
| 22 | 18 | 22 | 16.13 |
| 22 | 17 | 22 | 16.13 |
| 22 | 16 | 22 | 16 |
| 21 | 23 | 20.46 | 19.46 |
| 21 | 22 | 20.88 | 18.88 |
| 21 | 21 | 21 | 18.67 |
| 21 | 20 | 21 | 18.67 |
| 21 | 19 | 21 | 18.67 |
| 21 | 18 | 21 | 18 |
| 21 | 17 | 21 | 17 |
| 21 | 16 | 21 | 16 |
| 20 | 23 | 19.99 | 19.99 |
| 20 | 22 | 20 | 19.98 |
| 20 | 21 | 20 | 19.98 |
| 20 | 20 | 20 | 19.98 |
| 20 | 19 | 20 | 19 |
| 20 | 18 | 20 | 18 |
| 20 | 17 | 20 | 17 |
| 20 | 16 | 20 | 16 |

| $P_{req\_UL1}$ (dBm) | $P_{req\_UL2}$ (dBm) | $P_{UL1}$ (dBm) | $P_{UL2}$ (dBm) |
|---|---|---|---|
| 23 | 23 | 21.24 | 18.24 |
| 23 | 22 | 21.24 | 18.24 |
| 23 | 21 | 21.24 | 18.24 |
| 23 | 20 | 21.24 | 18.24 |
| 23 | 19 | 21.54 | 17.54 |
| 23 | 18 | 21.81 | 16.81 |
| 23 | 17 | 22.03 | 16.03 |
| 23 | 16 | 22.21 | 15.21 |
| 22 | 23 | 20.88 | 18.88 |
| 22 | 22 | 20.88 | 18.88 |
| 22 | 21 | 20.88 | 18.88 |
| 22 | 20 | 20.88 | 18.88 |
| 22 | 19 | 21.24 | 18.24 |
| 22 | 18 | 21.54 | 17.54 |
| 22 | 17 | 21.81 | 16.81 |
| 22 | 16 | 22.00 | 16.00 |
| 21 | 23 | 20.46 | 19.46 |
| 21 | 22 | 20.46 | 19.46 |
| 21 | 21 | 20.46 | 19.46 |
| 21 | 20 | 20.46 | 19.46 |
| 21 | 19 | 20.88 | 18.88 |
| 21 | 18 | 21.00 | 18.00 |
| 21 | 17 | 21.00 | 17.00 |
| 21 | 16 | 21.00 | 16.00 |
| 20 | 23 | 19.99 | 19.99 |
| 20 | 22 | 19.99 | 19.99 |
| 20 | 21 | 19.99 | 19.99 |
| 20 | 20 | 19.99 | 19.99 |
| 20 | 19 | 20.00 | 19.00 |
| 20 | 18 | 20.00 | 18.00 |
| 20 | 17 | 20.00 | 17.00 |
| 20 | 16 | 20.00 | 16.00 |

FIG. 11

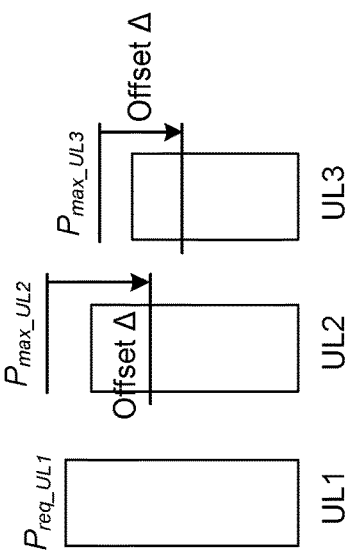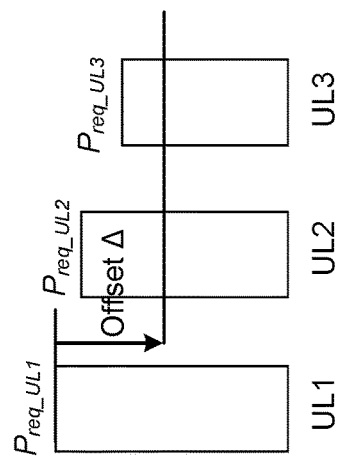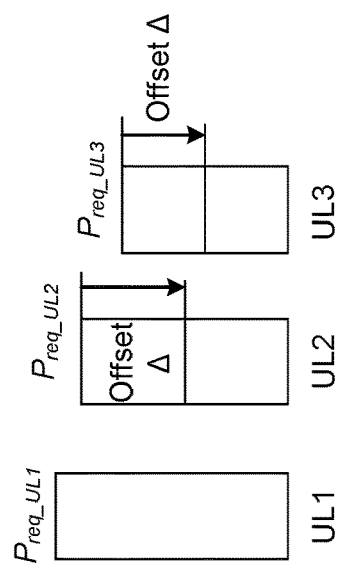
FIG. 14

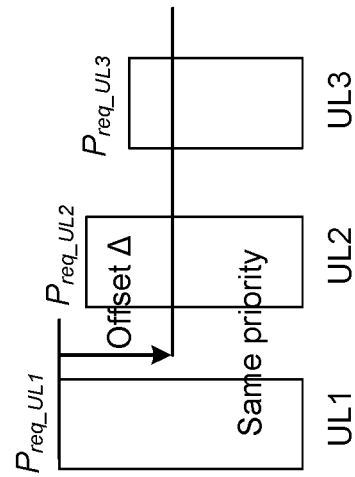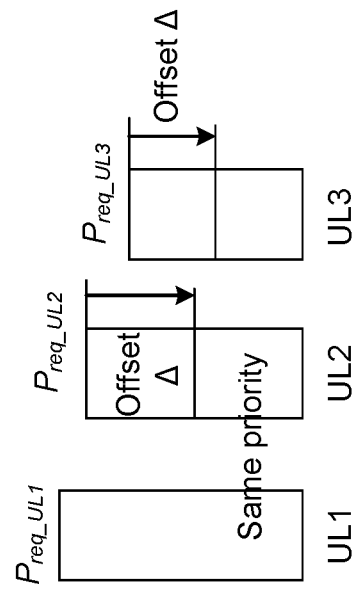
FIG. 15

TRANSMITTING OVERLAPPING UPLINK TRANSMISSIONS USING A POWER SCALING FACTOR

CROSS-REFERENCE TO RELATED APPLICATION

This Patent Application claims priority to U.S. Provisional Patent Application No. 63/261,926, filed on Sep. 30, 2021, entitled "TRANSMITTING OVERLAPPING UPLINK TRANSMISSIONS USING A POWER SCALING FACTOR," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmitting overlapping uplink transmissions using a power scaling factor.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, a method of wireless communication performed by a user equipment (UE) includes transmitting, to a network node, a first uplink transmission using a first transmit power that is based at least in part on: a first power level associated with the first uplink transmission, and a power scaling factor based at least in part on a power offset; and transmitting, to the network node, a second uplink transmission, at least partially overlapping in time with the first uplink transmission, using a second transmit power that is based at least in part on: a second power level associated with the second uplink transmission, a maximum available transmit power, and the first transmit power.

In some implementations, a method of wireless communication performed by a network node includes receiving, from a UE, a first uplink transmission using a first transmit power that is based at least in part on: a first power level associated with the first uplink transmission, and a power scaling factor based at least in part on a power offset; and receiving, from the UE, a second uplink transmission, at least partially overlapping in time with the first uplink transmission, using a second transmit power that is based at least in part on: a second power level associated with the second uplink transmission, a maximum available transmit power, and the first transmit power.

In some implementations, an apparatus for wireless communication at a UE includes a memory and one or more processors, coupled to the memory, configured to: transmit, to a network node, a first uplink transmission using a first transmit power that is based at least in part on: a first power level associated with the first uplink transmission, and a power scaling factor based at least in part on a power offset; and transmit, to the network node, a second uplink transmission, at least partially overlapping in time with the first uplink transmission, using a second transmit power that is based at least in part on: a second power level associated with the second uplink transmission, a maximum available transmit power, and the first transmit power.

In some implementations, an apparatus for wireless communication at a network node includes a memory and one or more processors, coupled to the memory, configured to: receive, from a UE, a first uplink transmission using a first transmit power that is based at least in part on: a first power level associated with the first uplink transmission, and a power scaling factor based at least in part on a power offset; and receive, from the UE, a second uplink transmission, at least partially overlapping in time with the first uplink transmission, using a second transmit power that is based at least in part on: a second power level associated with the second uplink transmission, a maximum available transmit power, and the first transmit power.

In some implementations, a non-transitory computer-readable medium storing a set of instructions for wireless communication includes one or more instructions that, when executed by one or more processors of a UE, cause the UE to: transmit, to a network node, a first uplink transmission using a first transmit power that is based at least in part on: a first power level associated with the first uplink transmission, and a power scaling factor based at least in part on a power offset; and transmit, to the network node, a second uplink transmission, at least partially overlapping in time with the first uplink transmission, using a second transmit power that is based at least in part on: a second power level associated with the second uplink transmission, a maximum available transmit power, and the first transmit power.

In some implementations, a non-transitory computer-readable medium storing a set of instructions for wireless communication includes one or more instructions that, when executed by one or more processors of a network node, cause the network node to: receive, from a UE, a first uplink transmission using a first transmit power that is based at least in part on: a first power level associated with the first uplink transmission, and a power scaling factor based at least in part on a power offset; and receive, from the UE, a second uplink transmission, at least partially overlapping in time with the first uplink transmission, using a second transmit power that is based at least in part on: a second power level associated with the second uplink transmission, a maximum available transmit power, and the first transmit power.

In some implementations, an apparatus for wireless communication includes means for transmitting, to a network node, a first uplink transmission using a first transmit power that is based at least in part on: a first power level associated with the first uplink transmission, and a power scaling factor based at least in part on a power offset; and means for transmitting, to the network node, a second uplink transmission, at least partially overlapping in time with the first uplink transmission, using a second transmit power that is based at least in part on: a second power level associated with the second uplink transmission, a maximum available transmit power, and the first transmit power.

In some implementations, an apparatus for wireless communication includes means for receiving, from a UE, a first uplink transmission using a first transmit power that is based at least in part on: a first power level associated with the first uplink transmission, and a power scaling factor based at least in part on a power offset; and means for receiving, from the UE, a second uplink transmission, at least partially overlapping in time with the first uplink transmission, using a second transmit power that is based at least in part on: a second power level associated with the second uplink transmission, a maximum available transmit power, and the first transmit power.

Aspects generally include a method, apparatus, system, computer program product, non-transitory computer-readable medium, user equipment, network node, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-15 are diagrams illustrating examples associated with power scaling for uplink carrier aggregation with a power offset, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
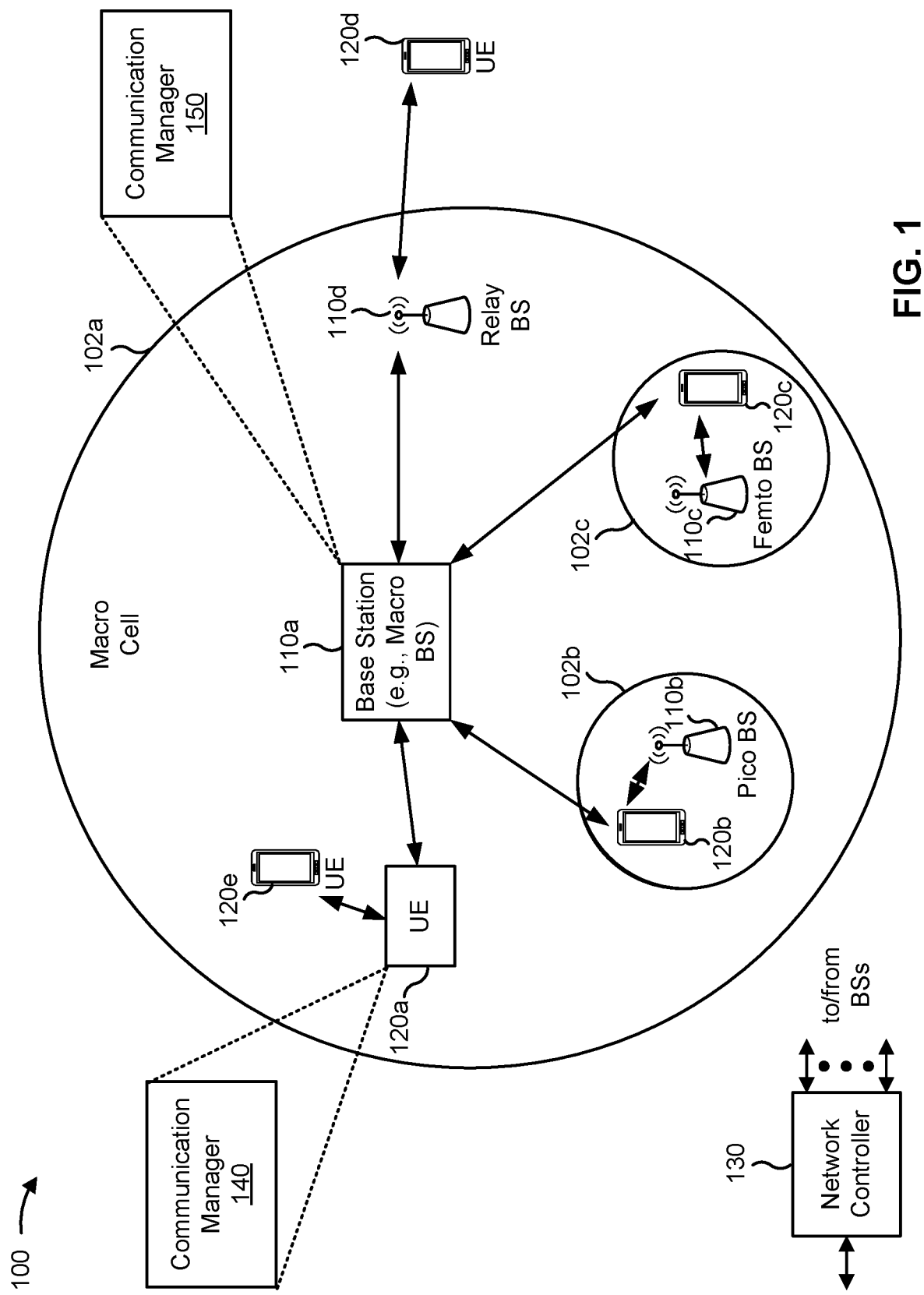
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the base station 110. In some aspects, the term "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations and/or one or more virtual base station functions. For example, in some aspects, two or more base station functions may be instantiated on a single device. In some aspects, the term "base station" or "network node" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit, to a network node, a first uplink transmission using a first transmit power that is based at least in part on: a first power level associated with the first uplink transmission, and a power scaling factor based at least in part on a power offset; and transmit, to the network node, a second uplink transmission, at least partially overlapping in time with the first uplink transmission, using a second transmit power that is based at least in part on: a second power level associated with the second uplink transmission, a maximum available transmit power, and the first transmit power. Additionally, or alternatively, the communication manager 140 may perform one or more other operations described herein.

In some aspects, a network node (e.g., base station 110) may include a communication manager 150. As described in more detail elsewhere herein, the communication manager 150 may receive, from a UE, a first uplink transmission using a first transmit power that is based at least in part on: a first power level associated with the first uplink transmission, and a power scaling factor based at least in part on a power offset; and receive, from the UE, a second uplink transmission, at least partially overlapping in time with the first uplink transmission, using a second transmit power that is based at least in part on: a second power level associated with the second uplink transmission, a maximum available transmit power, and the first transmit power. Additionally, or alternatively, the communication manager 150 may perform one or more other operations described herein.

As indicated above, FIG. 1 is provided as an example. Other examples may differ from what is described with regard to FIG. 1.

Figure 2:
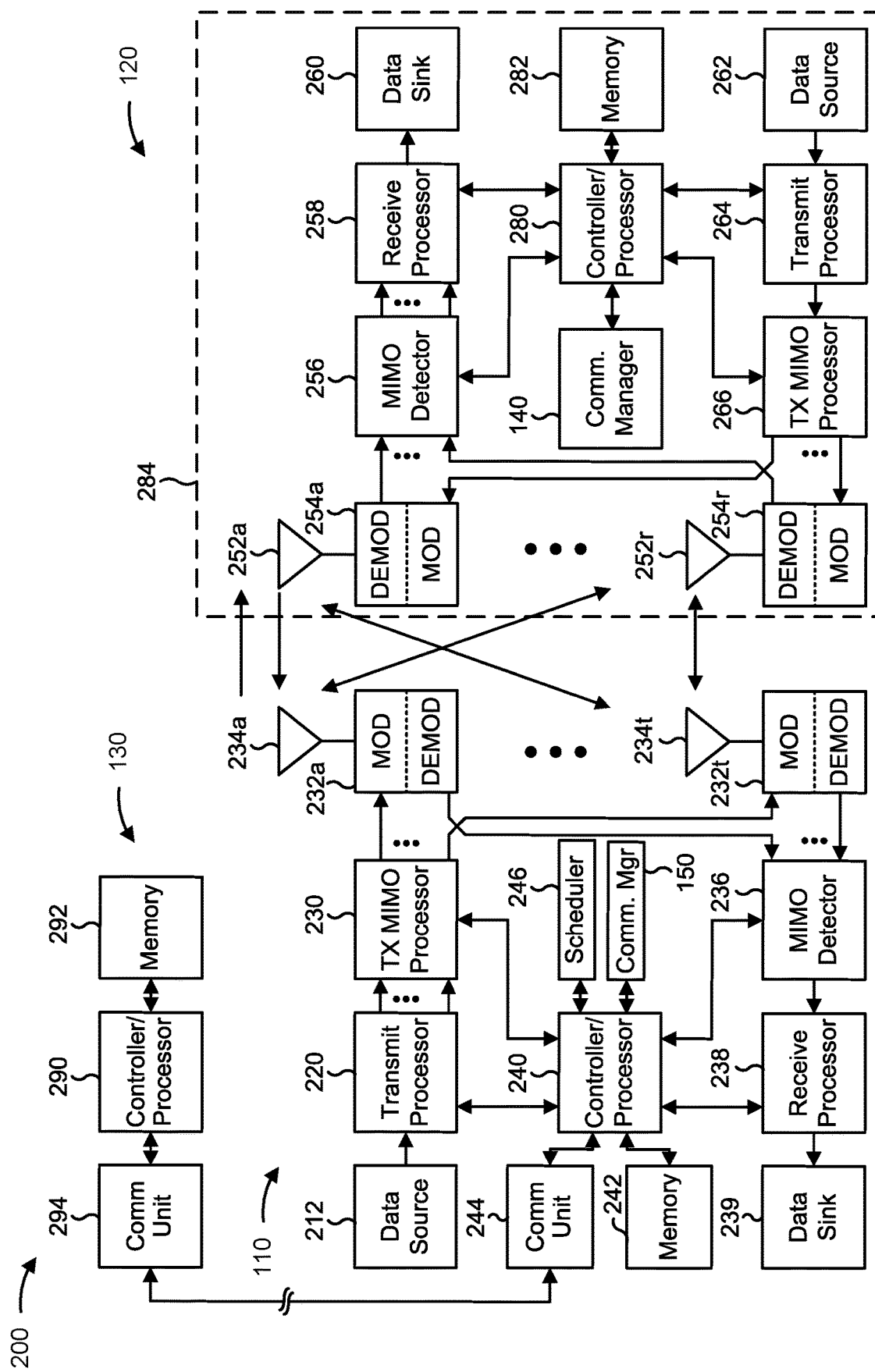
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-19).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-19).

The controller/processor 240 of the base station 110, the controller/processor 280 of the UE 120, and/or any other component(s) of FIG. 2 may perform one or more techniques associated with transmitting overlapping uplink transmissions using a power scaling factor, as described in more detail elsewhere herein. For example, the controller/processor 240 of the base station 110, the controller/processor 280 of the UE 120, and/or any other component(s) of FIG. 2 may perform or direct operations of, for example, process 1600 of FIG. 16, process 1700 of FIG. 17, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1600 of FIG. 16, process 1700 of FIG. 17, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting, to a network node, a first uplink transmission using a first transmit power that is based at least in part on: a first power level associated with the first uplink transmission, and a power scaling factor based at least in part on a power offset; and/or means for transmitting, to the network node, a second uplink transmission, at least partially overlapping in time with the first uplink transmission, using a second transmit power that is based at least in part on: a second power level associated with the second uplink transmission, a maximum available transmit power, and the first transmit power. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., base station) includes means for receiving, from a UE, a first uplink transmission using a first transmit power that is based at least in part on: a first power level associated with the first uplink transmission, and a power scaling factor based at least in part on a power offset; and/or means for receiving, from the UE, a second uplink transmission, at least partially overlapping in time with the first uplink transmission, using a second transmit power that is based at least in part on: a second power level associated with the second uplink transmission, a maximum available transmit power, and the first transmit power. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
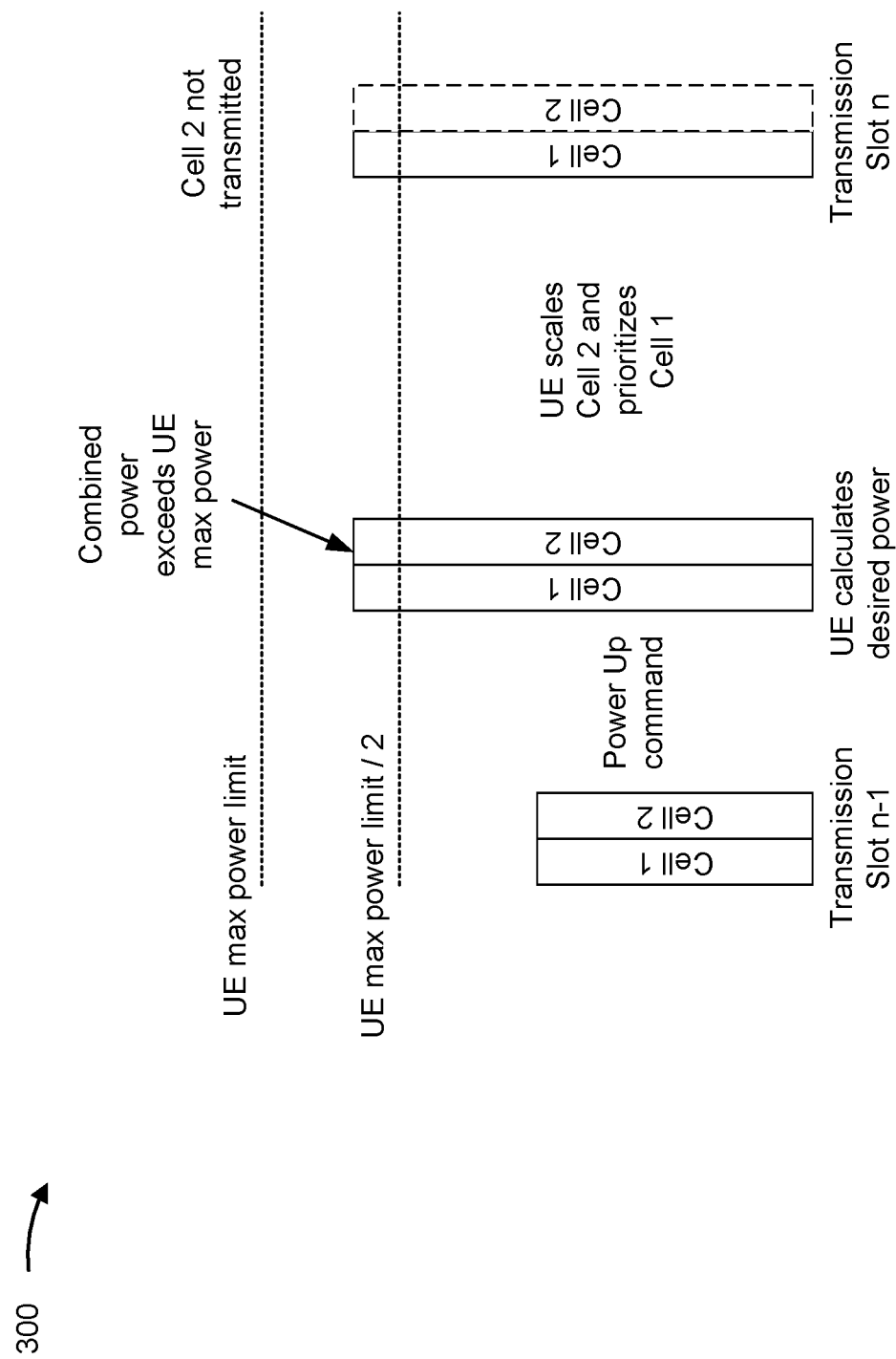
FIG. 3 is a diagram illustrating an example of uplink power scaling that may result in dropped transmissions, in accordance with the present disclosure.

FIG. 3 is a diagram illustrating an example 300 of uplink power scaling that may result in dropped transmissions, in accordance with the present disclosure.

A UE may communicate on an uplink using two or more uplink carriers. For example, the UE may communicate on the uplink using at least a first cell (shown as Cell 1) and a second cell (shown as Cell 2), where the first cell may include a primary cell (PCell), a primary secondary cell (PSCell), or a physical uplink control channel (PUCCH) secondary cell (SCell) (PUCCH-SCell) and the second cell may include one or more SCells. The UE may be configured with a maximum power limit that defines an upper bound on a total transmit power that the UE may use for uplink transmissions in a single transmission occasion.

A first transmission occasion (e.g., shown as slot n−1) may include a first uplink transmission configured on the first cell (e.g., a PCell, PSCell, or PUCCH-SCell) and a second uplink transmission configured on the second cell (e.g., an SCell). A combined transmit power for the first uplink transmission and the second uplink transmission may satisfy the maximum power limit for the first transmission occasion (e.g., because the transmit power for each uplink transmission is less than half of the maximum power limit, such that the sum is less than the maximum power limit). Accordingly, in the first transmission occasion, the UE may transmit the first uplink transmission on the first cell and the second uplink transmission on the second cell without performing any power scaling or power reduction.

The UE may calculate a desired uplink transmit power for a next transmission occasion based on a power up command that may be received from a network node prior to the next transmission occasion. In this case, the combined transmit power for the first uplink transmission and the second uplink transmission may fail to satisfy the maximum power limit for the next transmission occasion (e.g., because the transmit power for each uplink transmission exceeds half of the maximum power limit, such that the sum would exceed the maximum power limit). Accordingly, the UE may scale down the power of the uplink transmission on the second cell and prioritize the uplink transmission on the first cell to ensure that the total transmit power in the next transmission occasion satisfies the maximum power limit. In some cases, the power of the uplink transmission on the second cell may potentially be scaled down to zero, which may result in the UE dropping the uplink transmission on the second cell.

As indicated above, FIG. 3 is provided as an example. Other examples may differ from what is described with regard to FIG. 3.

Figure 4:
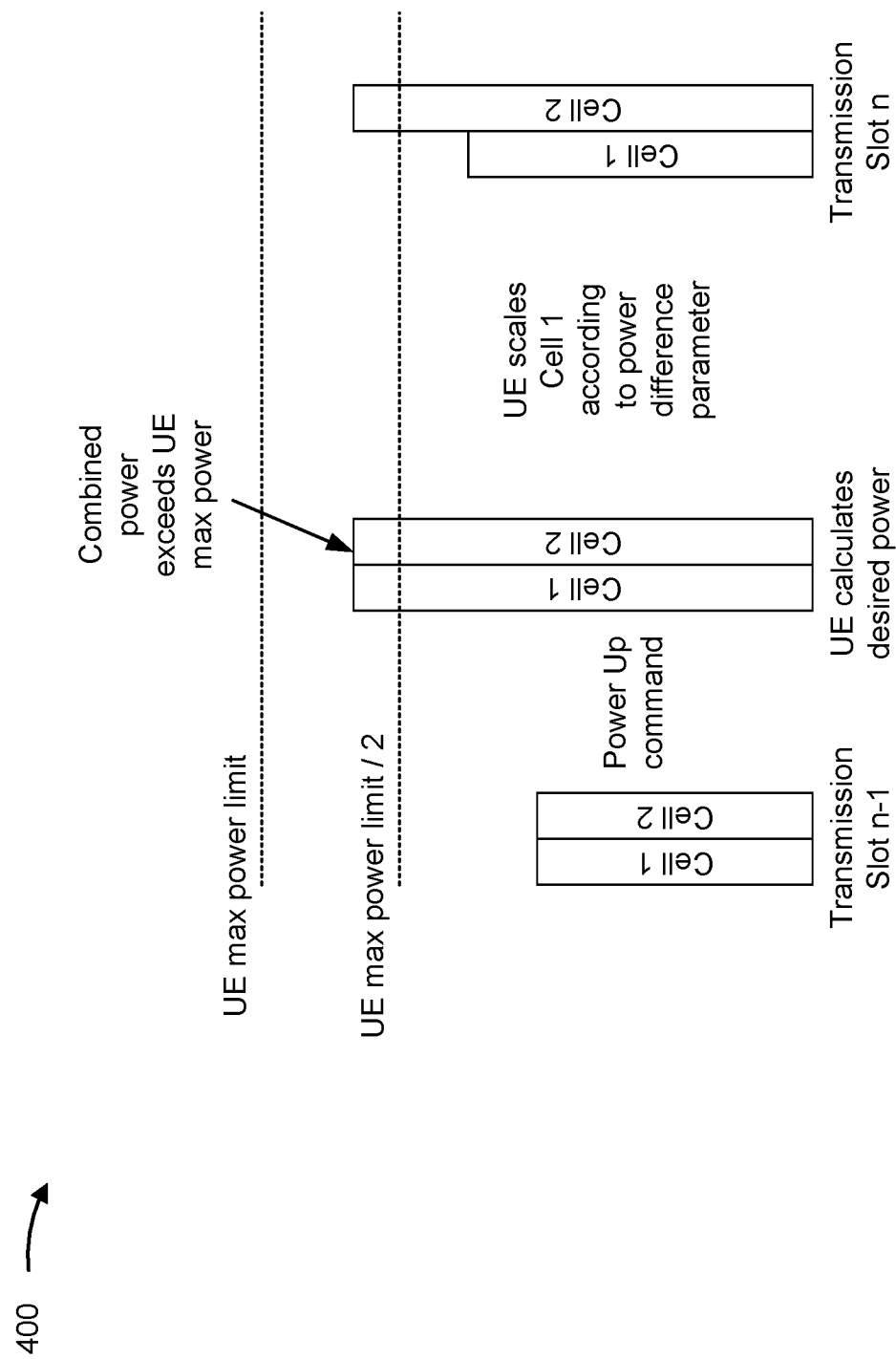
FIG. 4 is a diagram illustrating an example of relative power setting between different cells in dual connectivity or carrier aggregation, in accordance with the present disclosure.

FIG. 4 is a diagram illustrating an example 400 of a relative power setting between different cells in dual connectivity or carrier aggregation, in accordance with the present disclosure.

A UE may communicate on an uplink using two or more uplink carriers. For example, the UE may communicate on the uplink using at least a first cell (shown as Cell 1) and a second cell (shown as Cell 2), where the first cell may include a PCell, a PSCell, or a PUCCH-SCell, and the second cell may include one or more SCells. The UE may be configured with a maximum power limit that defines an upper bound on a total transmit power that the UE may use for uplink transmissions in a single transmission occasion.

A first transmission occasion (e.g., shown as slot n−1) may include a first uplink transmission configured on the first cell and a second uplink transmission configured on the second cell. A combined transmit power for the first uplink transmission and the second uplink transmission may satisfy the maximum power limit for the first transmission occasion. Accordingly, in the first transmission occasion, the UE may transmit the first uplink transmission on the first cell and the second uplink transmission on the second cell without performing any power scaling or power reduction.

The UE may calculate an uplink transmit power for a next transmission occasion (e.g., shown as slot n) based on a power up command that may be received from a network node prior to the next transmission occasion. In this case, the combined transmit power for the first uplink transmission and the second uplink transmission may fail to satisfy the maximum power limit for the next transmission occasion.

The UE may scale down the power of the uplink transmission on the first cell by applying a relative power difference between the first cell and the second cell. For example, applying the relative power difference may cause the transmit power of the first uplink transmission on the first cell to be at a lower level than the second uplink transmission on the second cell. In this way, the UE may transmit both the first uplink transmission on the first cell and the second uplink transmission on the second cell, with no power scaling applied to the second uplink transmission and the first uplink transmission scaled according to the relative power difference configured by the network node. In this way, even though the transmit power of the second uplink transmission exceeds half of the maximum power limit, the UE can transmit both the first uplink transmission on the first cell and the second uplink transmission on the second cell because the combined transmit power is less than the maximum power limit after applying the relative power difference.

As an example, the UE may determine a relative power difference of 2 dB, such that the second cell may be 2 dB more than the first cell. The UE may determine that, by applying the relative power difference of 2 dB, a combined transmit power for the first cell and the second cell may satisfy the maximum power limit.

As indicated above, FIG. 4 is provided as an example. Other examples may differ from what is described with regard to FIG. 4.

For single cell operation with two uplink carriers or for operation with carrier aggregation, when a total UE transmit power for transmissions on serving cells in a frequency range in a respective transmission occasion would exceed a maximum power limit ($P_{CMAX}$), a UE may allocate power to the transmissions according to a priority order (in descending order), so that the total UE transmit power for the transmissions on the serving cells in the frequency range is less than or equal to the maximum power limit. In other words, when the total transmit power is greater than the maximum power limit, the UE may allocate a transmission power to uplink transmissions according to the priority order so that the total transmit power becomes less than or equal to the maximum power limit. The transmissions may be physical uplink shared channel (PUSCH) transmissions, PUCCH transmissions, physical random access channel (PRACH) transmissions, or sounding reference signal (SRS) transmissions. The total UE transmit power in a symbol of a slot may be defined as a sum of linear values of UE transmit powers for PUSCH, PUCCH, PRACH and SRS in the symbol of the slot.

A transmission power for uplink carrier aggregation may follow a prioritization (or priority rules). A UE may reduce or drop a power allocation on a cell carrying a lower priority transmission, such as a secondary cell, which may deteriorate an uplink performance for carrier aggregation. Often, due to the prioritization, the cell carrying the lower priority transmission may receive no power allocation. As a result, power dropping on the cell associated with lower priority should be avoided, since the cell associated with the lower priority may still carry information that should be transmitted irrespective of the lower priority.

In various aspects of techniques and apparatuses described herein, a UE may transmit, to a network node, a first uplink transmission using a first transmit power. The first transmit power may be based at least in part on a first power level associated with the first uplink transmission, and a power scaling factor based at least in part on a power offset (or relative power offset). The UE may transmit, to the network node, a second uplink transmission, at least partially overlapping in time with the first uplink transmission, using a second transmit power. The second transmit power may be based at least in part on a second power level associated with the second uplink transmission, a maximum available transmit power, and the first transmit power. In some aspects, the first uplink transmission may be associated with a higher priority, and the second uplink transmission may be associated with a lower priority relative to the first uplink transmission. In some aspects, a total of the first power level and the second power level may exceed a maximum available power, and the UE may scale the total of the first power level and the second power level to obtain the first transmit power and the second transmit power. In some aspects, the second transmit power may be greater than zero, even though the second uplink transmission may have a lower priority than the first uplink transmission.

In some aspects, an uplink carrier aggregation power control may prevent transmission power dropping on a cell with a lower priority (e.g., for FR1 and FR2 carrier aggregation). The uplink carrier aggregation power control may involve power scaling for uplink carrier aggregation with the power offset. The uplink carrier aggregation power control may be applicable to both intra-band uplink carrier aggregation and inter-band uplink carrier aggregation within a same frequency range.

Figure 5:
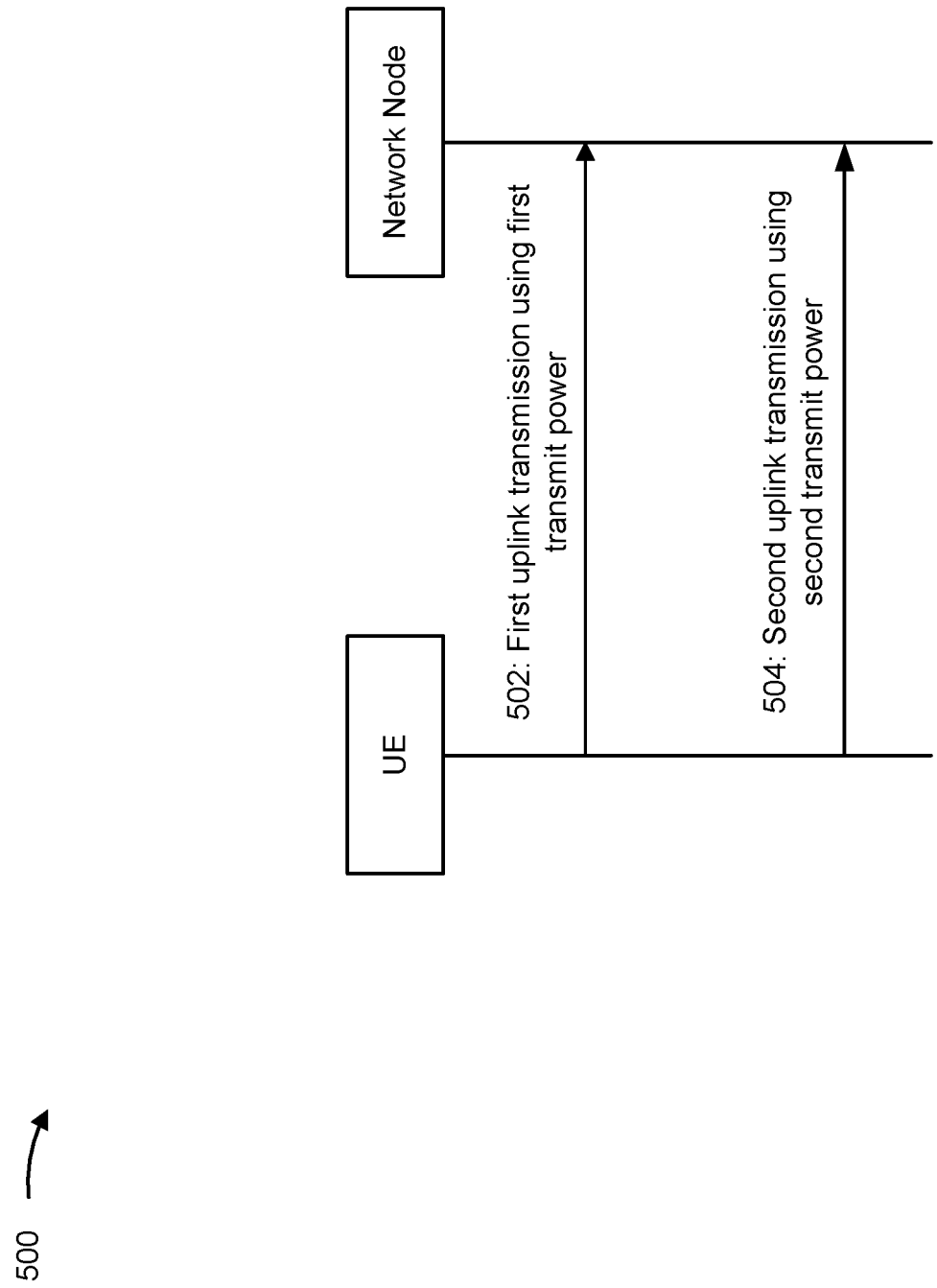
FIG. 5 is a diagram illustrating an example associated with transmitting overlapping uplink transmissions using a power scaling factor, in accordance with the present disclosure.

FIG. 5 is a diagram illustrating an example 500 associated with transmitting overlapping uplink transmissions using a power scaling factor, in accordance with the present disclosure. As shown in FIG. 5, example 500 includes communication between a UE (e.g., UE 120) and a network node (e.g., base station 110). In some aspects, the UE and the network node may be included in a wireless network, such as wireless network 100.

As shown by reference number 502, the UE may transmit, to the network node, a first uplink transmission using a first transmit power ($P_{UL1}$). The first uplink transmission may be a PUCCH transmission, a PUSCH transmission, a PRACH transmission, or an SRS transmission. The first transmit power may be based at least in part on a first power level ($P_{req\_UL1}$) associated with the first uplink transmission, and a power scaling factor (K) based at least in part on a power offset ($\Delta$).

As shown by reference number 504, the UE may transmit, to the network node, a second uplink transmission, at least partially overlapping in time with the first uplink transmission, using a second transmit power ($P_{UL2}$). The second uplink transmission may be a PUCCH transmission, a PUSCH transmission, a PRACH transmission, or an SRS transmission. The second transmit power may be based at least in part on a second power level ($P_{req\_UL2}$) associated with the second uplink transmission, a maximum available transmit power ($P_{tot}$), and the first transmit power.

In some aspects, the maximum available transmit power for the UE may correspond to a total available power for the UE across frequencies over a frequency range. In some aspects, the maximum available transmit power for the UE may correspond to a total available power for the UE across carriers over a frequency band. In some aspects, the maximum available transmit power for the UE may correspond to a total available power for the UE across a group of frequency bands.

In some aspects, the UE may receive, from the network node, an indication of the power offset, via radio resource control (RRC) signaling, a medium access control control element (MAC-CE), or downlink control information (DCI). The UE may apply the power offset to the second uplink transmission.

In some aspects, the UE may determine that a total of the first power level and the second power level exceeds the maximum available transmit power. The UE may scale the total of the first power level and the second power level to obtain the first transmit power associated with the first uplink transmission and the second transmit power associated with the second uplink transmission.

In some aspects, the UE may determine the power scaling factor based at least in part on the first power level, the power offset, the second power level, and the maximum available transmit power. The UE may determine the first transmit power based at least in part on a minimum of: the first power level, the power scaling factor, and the first power level. The UE may determine the second transmit power based at least in part on a minimum of: the second power level, and a difference between the maximum available transmit power and the first transmit power.

In some aspects, the UE may determine a temporary power level based at least in part on a minimum of: the second power level, the power offset, and the first power level. The UE may determine the power scaling factor based at least in part on the first power level, the temporary power level, and the maximum available transmit power.

In some aspects, the UE may determine a temporary power level based at least in part on a minimum of: the second power level, the power offset, and a maximum available power for the second uplink transmission. The UE may determine the power scaling factor based at least in part on the first power level, the temporary power level, and the maximum available transmit power.

In some aspects, the first uplink transmission may be associated with a first uplink carrier and the second uplink transmission may be associated with a second uplink carrier. The UE may receive, from the network node, a configuration of the power offset for the second uplink carrier. The UE may apply the power offset to the second uplink transmission associated with the second uplink carrier irrespective of a power allocation priority between the second uplink transmission and the first uplink transmission.

In some aspects, the UE may receive, from the network node, a configuration of the power offset for an uplink carrier aggregation. The UE may apply the power offset to the first uplink transmission or the second uplink transmission based at least in part on the power allocation priority between the first uplink transmission and the second uplink transmission.

In some aspects, the power allocation priority may indicate an equal priority level between the first uplink transmission and the second uplink transmission. The UE may apply the power offset to the first uplink transmission or the second uplink transmission based at least in part on a first index associated with the first uplink transmission and a second index associated with the second uplink transmission.

In some aspects, the power allocation priority may indicate an equal priority level between the first uplink transmission and the second uplink transmission. The UE may apply a smaller power offset as compared to power offsets applied to uplink transmissions associated with different priority levels.

In some aspects, a first transmission time interval (TTI) associated with the first uplink transmission may not be aligned with a second TTI associated with the second uplink transmission. In some aspects, the UE may apply the power offset to the first uplink transmission or the second uplink transmission at a symbol level based at least in part on a (pre)-configuration, where a power scaling may change during the first uplink transmission or the second uplink transmission based at least in part on the power allocation priority. In some aspects, the UE may apply the power offset to the first uplink transmission or the second uplink transmission at a slot level or at a subframe level based at least in part on a (pre)-configuration, where the power scaling may be fixed during a slot or subframe.

In some aspects, the UE may determine, based at least in part on a plurality of uplink transmissions including the first uplink transmission and the second uplink transmission, the power scaling factor based at least in part on the first power level, the power offset multiplied by each of a plurality of power levels associated with the plurality of uplink transmissions, and the maximum available transmit power. The UE may determine the first transmit power and the second transmit power based at least in part on the power scaling factor.

In some aspects, the UE may determine, based at least in part on a plurality of uplink transmissions including the first uplink transmission and the second uplink transmission, the power scaling factor based at least in part on the first power level, the power offset multiplied by the first power level for each of the plurality of uplink transmissions, and the maximum available transmit power. The UE may determine the first transmit power and the second transmit power based at least in part on the power scaling factor.

In some aspects, the UE may determine, based at least in part on a plurality of uplink transmissions including the first uplink transmission and the second uplink transmission, the power scaling factor based at least in part on the first power level, the power offset multiplied by each of a plurality of maximum available powers associated with the plurality of uplink transmissions, and the maximum available transmit power. The UE may determine the first transmit power and the second transmit power based at least in part on the power scaling factor.

In some aspects, the UE may determine to not apply the power offset to the first uplink transmission or the second uplink transmission based at least in part on a priority level associated with the first uplink transmission or a priority level associated with the second uplink transmission, and/or a first index of a first uplink carrier associated with the first uplink transmission or second index of a second uplink carrier associated with the second uplink transmission.

In some aspects, the UE may determine, for a plurality of uplink transmissions including the first uplink transmission and the second uplink transmission, a priority level for each of the plurality of uplink transmissions. The UE may apply the power offset to one or more of the plurality of uplink transmissions, where the power offset may be based at least in part on a reference uplink transmission from the plurality of uplink transmissions, and where the reference uplink transmission may be associated with a higher priority level as compared to other uplink transmissions of the plurality of uplink transmissions.

As indicated above, FIG. 5 is provided as an example. Other examples may differ from what is described with regard to FIG. 5.

In some aspects, a UE may concurrently perform a first uplink transmission (UL1) and a second uplink transmission (UL2). The UE may determine a first power level for the first uplink transmission ($P_{req\_UL1}$) and a second power level for the second uplink transmission ($P_{req\_UL2}$). The UE may calculate (or request) the first power level and the second power level prior to an uplink carrier aggregation power-limited handling, which may occur when a total power of the first power level and the second power level (e.g., $P_{req\_UL1}$+ $P_{req\_UL2}$) over the first uplink transmission and the second uplink transmission exceeds a maximum available power ($P_{tot}$).

In some aspects, $P_{req\_UL1}$ and $P_{req\_UL2}$ may correspond to, and the UE may calculate in the same was as, $P_{PUSCH,b,f,c}$ (i,j,$q_d$,l) for a PUSCH transmission, $P_{PUCCH,b,f,c}$(i,j,$q_d$,l) for a PUCCH transmission, $P_{PRACH,b,f,c}$(i) for a PRACH transmission, and/or $P_{SRS,b,f,c}$(i,$q_s$,l) for an SRS transmission, as further described in 3GPP Technical Specification (TS) 38.213 v16.7.0 Sections 7.1.1, 7.2.1, 7.3.1, and 7.4. The UE may calculate $P_{req\_UL1}$ and $P_{req\_UL2}$ for an active uplink bandwidth part (BWP) b of carrier f in a primary cell c using a power control adjustment state with index l, and in a transmission occasion i, and where $q_d$ is a downlink pathloss estimate. In other words, $P_{req\_UL1}$ and $P_{req\_UL2}$ may correspond to calculated uplink transmission powers for when no concurrent transmissions are present in another carrier of the UE.

When the total power of the first power level and the second power level exceeds $P_{tot}$, the UE may scale a power of the first uplink transmission and/or the second uplink transmission such that the total power is less than or equal to $P_{tot}$. In some examples, $P_{tot}$ may be a total available power per UE (across frequencies per frequency range (FR), such as $P_{CMAX}$, or per frequency band or per a group of frequency bands). The UE may determine a first transmit power of the first uplink transmission ($P_{UL1}$) after a power adjustment/scaling, and the UE may determine a second transmit power of the second uplink transmission ($P_{UL2}$) after a power adjustment/scaling.

In some aspects, power scaling for uplink carrier aggregation may involve a power offset. The power offset may be for a lower priority uplink transmission. For example, the first uplink transmission may be associated with a higher priority uplink transmission and the second uplink transmission may be associated with a lower priority transmission, relative to the first uplink transmission, and the power offset may be applied to the second uplink transmission.

In some aspects, the power offset may be network controllable. For example, the UE may receive, from a network node, an indication of the power offset. The network node may configure the power offset via RRC signaling, a MAC-CE, or DCI.

In some aspects, a power offset Δ (in dB) may be used as $P_{UL2}=\delta P_{req\_UL2}$, where δ represents a linear expression of the power offset Δ (in dB). In other words, the power offset Δ may be based at least in part on $P_{req\_UL2}$ (and independent of $P_{req\_UL1}$). For example, the power offset Δ may represent an offset value in dB relative to $P_{req\_UL2}$. The UE may determine a power scaling factor K, such that $K\times\{P_{req\_UL1}+ \delta\times P_{req\_UL2}\}=P_{tot}$. The UE may determine $P_{UL1}$ according to:

$P_{UL1}=\min\{P_{req\_UL1}, K\times P_{req\_UL1}\}$. The UE may determine $P_{UL2}$ according to: $P_{UL2}=\min\{P_{req\_UL2}, P_{tot}-P_{UL1}\}$. In this case, $P_{UL2}$ may be a remaining power after $P_{UL1}$ is allocated.

Figure 6:
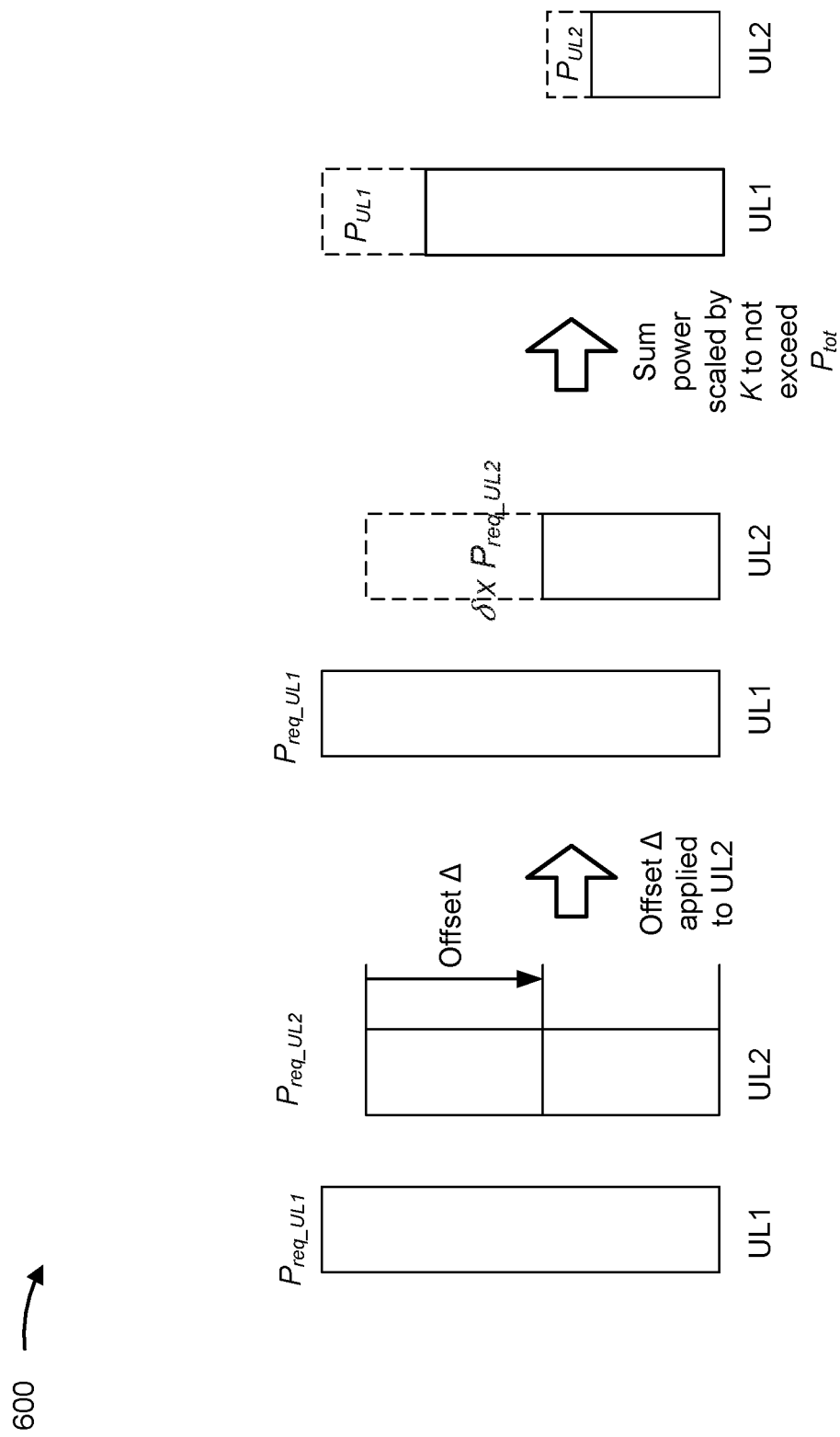

FIG. 6 is a diagram illustrating an example 600 associated with power scaling for uplink carrier aggregation with a power offset, in accordance with the present disclosure.

As shown in FIG. 6, a power offset Δ may be used as $P_{UL2}=\delta P_{req\_UL2}$, and a total power of $P_{req\_UL1}$ and $P_{req\_UL2}$ may exceed $P_{tot}$. The UE may determine a power scaling factor K, such that $K\times\{P_{req\_UL1}+\delta\times P_{req\_UL2}\}=P_{tot}$. In a power-limited scenario, a sum power between UL1 and UL2 may be scaled by K, such that a result does not exceed $P_{tot}$ (e.g., is equal to $P_{tot}$). The UE may determine $P_{UL1}$ according to: $P_{UL1}=\text{Min}\{P_{req\_UL1}, K\times P_{req\_UL1}\}$. The UE may determine $P_{UL2}$ according to: $P_{UL2}=\min\{P_{req\_UL2}, P_{tot}-P_{UL1}\}$.

As indicated above, FIG. 6 is provided as an example. Other examples may differ from what is described with regard to FIG. 6.

FIG. 7 is a diagram illustrating an example 700 associated with power scaling for uplink carrier aggregation with a power offset, in accordance with the present disclosure.

As shown in FIG. 7, for $P_{tot}$=23 dBm and Δ=−3 dB for UL2, a plurality of values may be defined for different combinations of $P_{req\_UL1}$ (dBm), $P_{req\_UL2}$ (dBm), $P_{UL1}$ (dBm), and $P_{UL2}$ (dBm). Here, the power offset Δ may be used as $P_{UL2}=\delta P_{req\_UL2}$. Values associated with $P_{UL2}$ may be less than values associated with $P_{UL1}$, since $P_{UL2}$ may be associated with a lower priority as compared to $P_{UL1}$. However, the values associated with $P_{UL2}$ may be sufficient for performing a second uplink transmission.

As indicated above, FIG. 7 is provided as an example. Other examples may differ from what is described with regard to FIG. 7.

In some aspects, a power offset Δ (in dB) may be used as $P_{UL2}=\delta P_{req\_UL1}$. In other words, the power offset Δ may be based at least in part on $P_{req\_UL1}$ (and independent of $P_{req\_UL2}$) For example, the power offset Δ may represent an offset value in dB relative to $P_{req\_UL1}$. The UE may determine a temporary power level for $P_{UL2}$ ($P_{UL2\_tmp}$) according to: $P_{UL2\_tmp}=\min\{P_{req\_UL2}, \delta\times P_{req\_UL1}\}$. The UE may determine a power scaling factor K, such that $K\times\{P_{req\_UL1}+ P_{req\_tmp}\}=P_{tot}$. The UE may determine $P_{UL1}$ according to: $P_{UL1}=\min\{P_{req\_UL1}, K\times P_{req\_UL1}\}$. The UE may determine $P_{UL2}$ according to: $P_{UL2}=\min\{P_{req\_UL2}, P_{tot}-P_{UL1}\}$.

Figure 8:
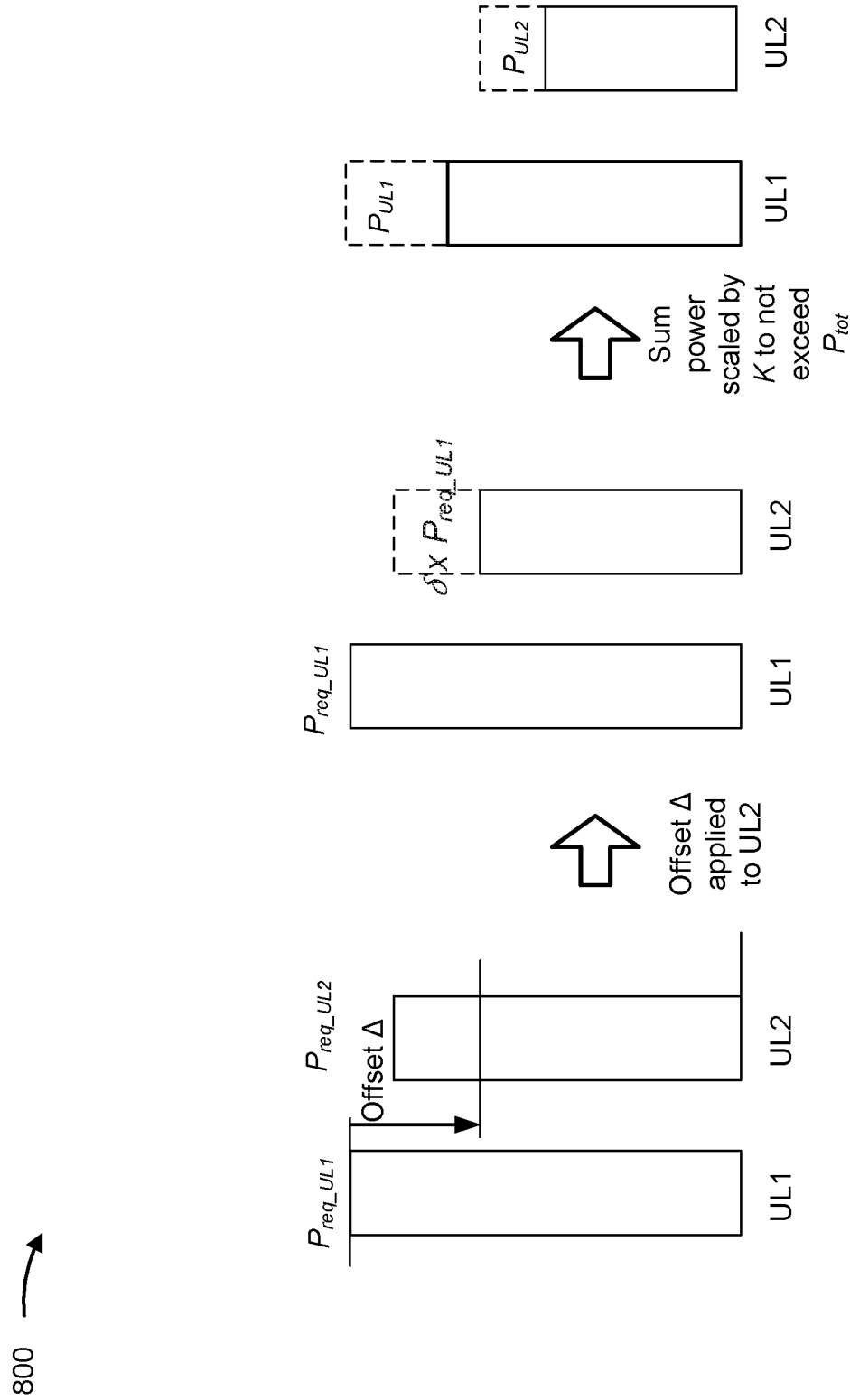

FIG. 8 is a diagram illustrating an example 800 associated with power scaling for uplink carrier aggregation with a power offset, in accordance with the present disclosure.

As shown in FIG. 8, a power offset Δ may be used as $P_{UL2}=\delta P_{req\_UL1}$, and a total power of $P_{req\_UL1}$ and $P_{req\_UL2}$ may exceed $P_{tot}$. The UE may determine a temporary power level for $P_{UL2}$ ($P_{UL2\_tmp}$) according to: $P_{UL2\_tmp}=\min\{P_{req\_UL2}, \delta\times P_{req\_UL1}\}$. The UE may determine a power scaling factor K, such that $K\times\{P_{req\_UL1}+ P_{UL2\_tmp}\}=P_{tot}$. In a power-limited scenario, a sum power between UL1 and UL2 may be scaled by K, such that a result does not exceed $P_{tot}$ (e.g., is equal to $P_{tot}$). The UE may determine $P_{UL1}$ according to: $P_{UL1}=\min\{P_{req\_UL1}, K\times P_{req\_UL1}\}$. The UE may determine $P_{UL2}$ according to: $P_{UL2}=\min\{P_{req\_UL2}, P_{tot}-P_{UL1}\}$.

As indicated above, FIG. 8 is provided as an example. Other examples may differ from what is described with regard to FIG. 8.

Figure 9:

FIG. 9 is a diagram illustrating an example 900 associated with power scaling for uplink carrier aggregation with a power offset, in accordance with the present disclosure.

As shown in FIG. 9, for $P_{tot}=23$ dBm and $\Delta=-3$ dB for UL2, a plurality of values may be defined for different combinations of $P_{req\_UL1}$ (dBm), $P_{req\_UL2}$ (dBm), $P_{UL1}$ (dBm), and $P_{UL2}$ (dBm). Here, the power offset $\Delta$ may be used as $P_{UL2}=\delta P_{req\_UL1}$. Values associated with $P_{UL2}$ may be less than values associated with $P_{UL1}$, since $P_{UL2}$ may be associated with a lower priority as compared to $P_{UL1}$. However, the values associated with $P_{UL2}$ may be sufficient for performing a second uplink transmission.

As indicated above, FIG. 9 is provided as an example. Other examples may differ from what is described with regard to FIG. 9.

In some aspects, a power offset $\Delta$ may be used as $P_{UL2}=\delta P_{max\_UL2}$, where $P_{max\_UL2}$ may indicate a maximum available power for UL2 on a carrier when there is no concurrent uplink transmission(s). In some cases, $P_{max\_UL2}$ may be a $P_{CMAX}$ for a carrier of a serving cell. In other words, the power offset $\Delta$ may be based at least in part on $P_{max\_UL2}$ (and independent of $P_{req\_UL2}$ and $P_{req\_UL2}$). For example, the power offset $\Delta$ may represent an offset value in dB relative to $P_{req\_UL1}$. The UE may determine a temporary power level for $P_{UL2}$ ($P_{UL2\_tmp}$) according to: $P_{UL2\_tmp}=\min\{P_{req\_UL2}, \delta \times P_{max\_UL2}\}$. The UE may determine a power scaling factor K, such that $K\times\{P_{req\_UL1}+P_{UL2\_tmp}\}=P_{tot}$. The UE may determine $P_{UL1}$ according to: $P_{UL1}=\min\{P_{req\_UL1}, K\times P_{req\_UL1}\}$. The UE may determine $P_{UL2}$ according to: $P_{UL2}=\min\{P_{req\_UL2}, P_{tot}-P_{UL1}\}$.

Figure 10:
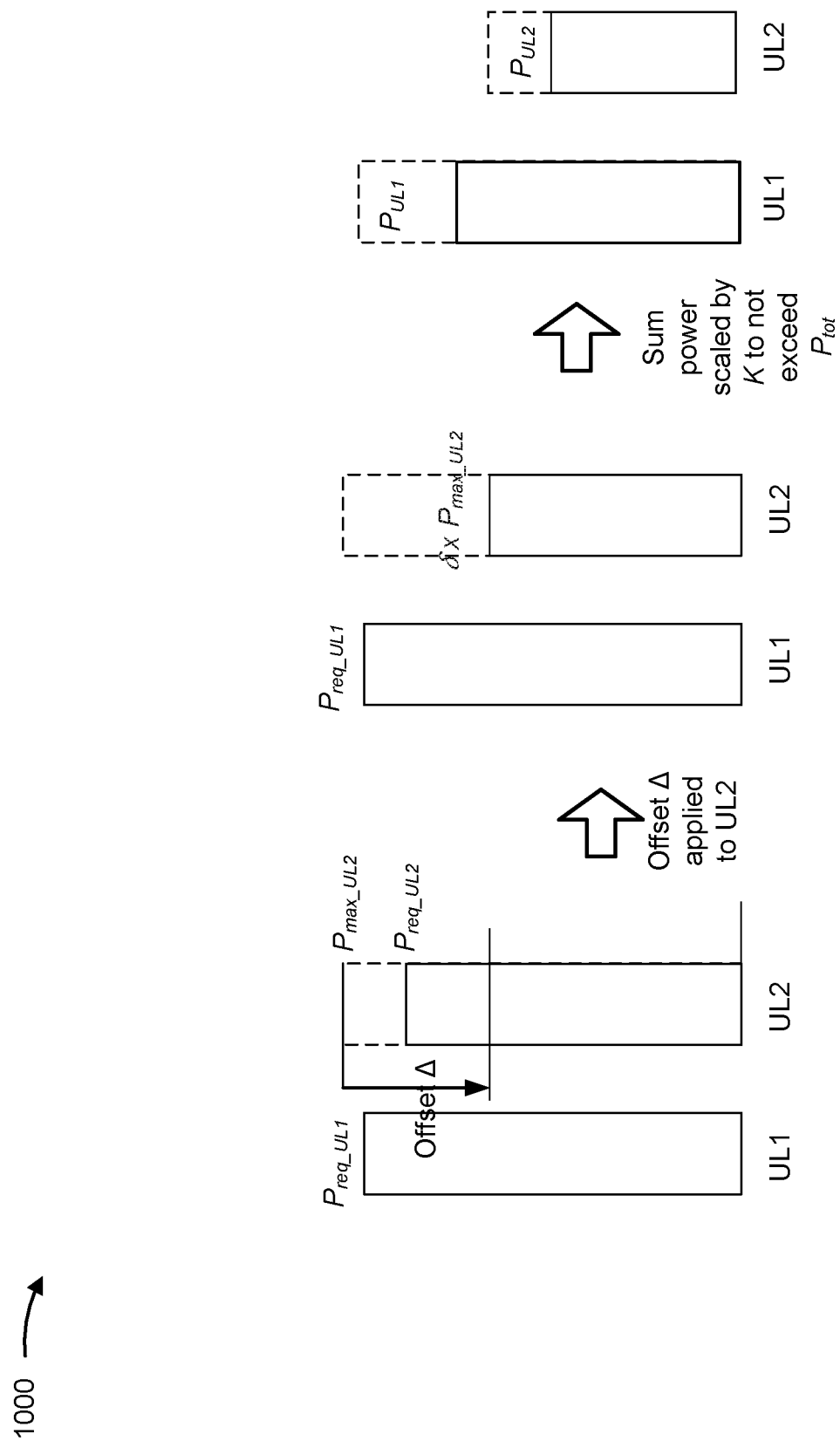

FIG. 10 is a diagram illustrating an example 1000 associated with power scaling for uplink carrier aggregation with a power offset, in accordance with the present disclosure.

As shown in FIG. 10, a power offset $\Delta$ may be used as $P_{UL2}=\delta P_{max\_UL2}$, and a total power of $P_{req\_UL1}$ and $P_{req\_UL2}$ may exceed $P_{tot}$. The UE may determine a temporary power level for $P_{UL2}$ (P-UL2 tow) according to: $P_{UL2\_tmp}=\min\{P_{req\_UL2}, \delta \times P_{max\_UL2}\}$. The UE may determine a power scaling factor K, such that $K\times\{P_{req\_UL1}+P_{UL2\_tmp}\}=P_{tot}$. In a power-limited scenario, a sum power between UL1 and UL2 may be scaled by K, such that a result does not exceed $P_{tot}$ (e.g., is equal to $P_{tot}$). The UE may determine $P_{UL1}$ according to: $P_{UL1}=\min\{P_{req\_UL1}, K\times P_{req\_UL1}\}$. The UE may determine $P_{UL2}$ according to: $P_{UL2}=\min\{P_{req\_UL2}, P_{tot}-P_{UL1}\}$.

As indicated above, FIG. 10 is provided as an example. Other examples may differ from what is described with regard to FIG. 10.

FIG. 11 is a diagram illustrating an example 1100 associated with power scaling for uplink carrier aggregation with a power offset, in accordance with the present disclosure.

As shown in FIG. 11, for $P_{tot}=23$ dBm, $P_{max\_UL2}=23$ dBm, and $\Delta=-3$ dB for UL2, a plurality of values may be defined for different combinations of $P_{req\_UL1}$ (dBm), $P_{req\_UL2}$ (dBm), $P_{UL1}$ (dBm), and $P_{UL2}$ (dBm). Here, the power offset $\Delta$ may be used as $P_{UL2}=\delta P_{max\_UL2}$. Values associated with $P_{UL2}$ may be less than values associated with $P_{UL1}$, since $P_{UL2}$ may be associated with a lower priority as compared to $P_{UL1}$. However, the values associated with $P_{UL2}$ may be sufficient for performing a second uplink transmission.

As indicated above, FIG. 11 is provided as an example. Other examples may differ from what is described with regard to FIG. 11.

In some aspects, the UE may determine whether the power offset $\Delta$ is associated with the first uplink transmission or the second uplink transmission. For two concurrent uplink transmissions, the UE may determine which uplink transmission corresponds to UL1 and which uplink transmission corresponds to UL2.

In some aspects, a first uplink carrier may correspond to UL1 and a second uplink carrier may correspond to UL2, respectively. The power offset $\Delta$ may be configured for an uplink carrier, and then the offset $\Delta$ may be added to an uplink transmission on the uplink carrier, regardless of a power allocation priority.

In some aspects, UL1 and UL2 may correspond to concurrent uplink transmissions, where an uplink transmission may be UL1 or UL2 based at least in part on the power allocation priority. The power offset $\Delta$ may be configured for uplink carrier aggregation, and the power offset $\Delta$ may be applied to an uplink transmission in accordance with the power allocation priority. In case of a same priority for the concurrent uplink transmissions, the power offset $\Delta$ may be added on a particular carrier (e.g., for a larger serving cell index). Alternatively, for the same priority for the concurrent uplink transmissions, the power offset $\Delta$ may be smaller than a power offset A associated with different priorities. For example, the power offset $\Delta$ for the same priority for the concurrent uplink transmissions may be set to zero.

Figure 12:
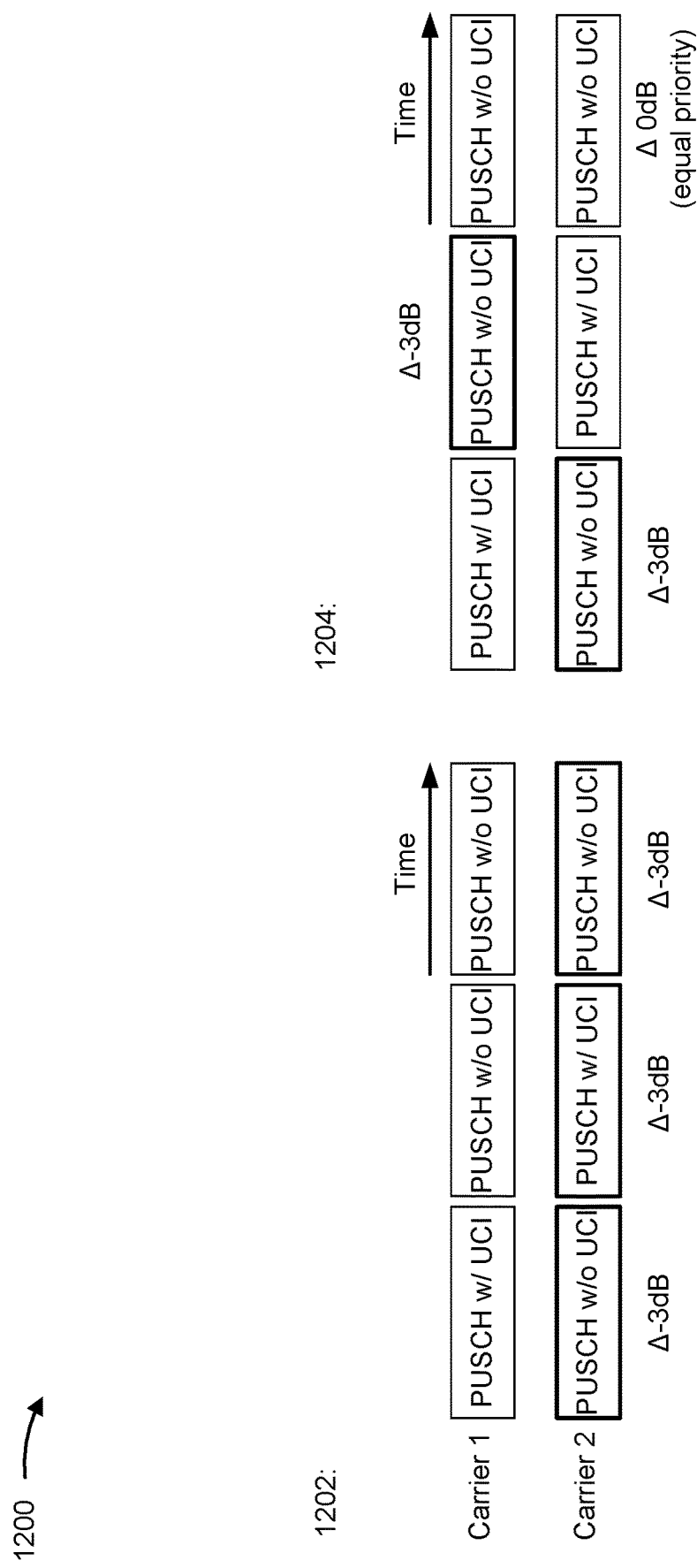

FIG. 12 is a diagram illustrating an example 1200 associated with power scaling for uplink carrier aggregation with a power offset, in accordance with the present disclosure.

In some aspects, a first uplink carrier may be associated with UL1 and a second uplink carrier may be associated with UL2. A power offset $\Delta$ may be configured for the second uplink carrier, such that the power offset $\Delta$ may be applied to uplink transmissions associated with the second uplink carrier. The power offset $\Delta$ may be applied to the uplink transmissions associated with the second uplink carrier regardless of a power allocation priority.

As shown by reference number 1202, at a first TTI (e.g., symbol, slot, or subframe), the first uplink carrier may be associated with a PUSCH with uplink control information (UCI) and the second uplink carrier may be associated with a PUSCH without UCI. At a second TTI, the first uplink carrier may be associated with a PUSCH without UCI and the second uplink carrier may be associated with a PUSCH with UCI. At a third TTI, the first uplink carrier may be associated with a PUSCH without UCI and the second uplink carrier may be associated with a PUSCH without UCI. In all of these examples, the power offset $\Delta$ of $-3$ dB may be always applied to the second uplink carrier regardless of the power allocation priority.

In some aspects, the power offset $\Delta$ may be applied to either a first uplink transmission associated with the first uplink carrier or a second uplink transmission associated with the second uplink carrier based at least in part on a power allocation priority.

As shown by reference number 1204, at a first TTI, the first uplink carrier may be associated with a PUSCH with UCI and the second uplink carrier may be associated with a PUSCH without UCI. The power offset $\Delta$ of $-3$ dB may be applied to the second uplink carrier since the PUSCH with UCI may have a higher priority than the PUSCH without UCI. At a second TTI, the first uplink carrier may be associated with a PUSCH without UCI and the second uplink carrier may be associated with a PUSCH with UCI. The power offset $\Delta$ of $-3$ dB may be applied to the first uplink carrier since the PUSCH without UCI may have a lower priority than the PUSCH without UCI. At a third TTI, the first uplink carrier may be associated with a PUSCH without UCI and the second uplink carrier may be associated with a PUSCH without UCI. In this case, a power offset $\Delta$ of zero may be applied since the first uplink carrier and the second uplink carrier may have an equal priority.

As indicated above, FIG. 12 is provided as an example. Other examples may differ from what is described with regard to FIG. 12.

In some aspects, TTIs may not be aligned for concurrent uplink transmissions. In some uplink carrier aggregation scenarios (e.g., inter-band uplink carrier aggregation with different numerologies), the concurrent uplink transmissions may not be aligned across uplink carriers. In this case, power allocation priorities may vary even during a middle of an uplink transmission.

In some aspects, the power offset Δ may be applied to an uplink transmission in accordance with the power allocation priority. The power offset Δ may be applied at a symbol level or at a slot/subframe level.

Figure 13:
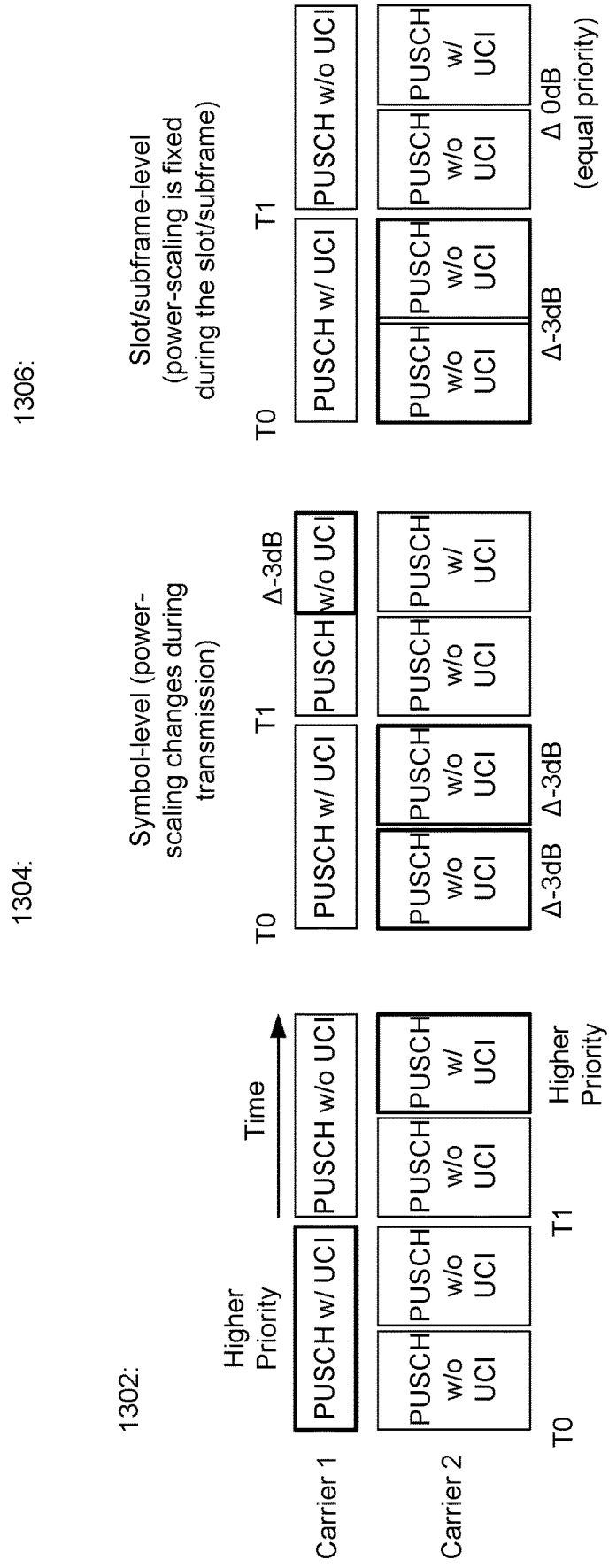

FIG. 13 is a diagram illustrating an example 1300 associated with power scaling for uplink carrier aggregation with a power offset, in accordance with the present disclosure.

As shown by reference number 1302, at a first time (T0), a PUSCH with UCI on a first uplink carrier may have a higher priority than two PUSCHs without UCI on a second uplink carrier, where the PUSCH on the first uplink carrier may be of a same time duration as the two PUSCHs on the second uplink carrier. A TTI may not be aligned for concurrent transmissions with respect to the first uplink carrier and the second uplink carrier, since the two PUSCHs without UCI on the second uplink carrier may be a same time duration as the PUSCH with UCI on the first uplink carrier.

At a second time (T1), a PUSCH without UCI on the first uplink carrier may overlap in time with a PUSCH without UCI on the second uplink carrier and a PUSCH without UCI on the second uplink carrier. A first half of the PUSCH without UCI on the first uplink carrier may have an equal priority as compared to the PUSCH without UCI on the second uplink carrier. However, a second half of the PUSCH without UCI on the first uplink carrier may not have an equal priority as compared to the PUSCH with UCI on the second uplink carrier. In this case, the PUSCH with UCI on the second uplink carrier may have a higher priority as compared to the second half of the PUSCH without UCI on the first uplink carrier.

As shown by reference number 1304, at T0, the power scaling for uplink carrier aggregation with the relative offset may be performed at a symbol level, where the power scaling may change during an uplink transmission. For example, the power offset Δ of −3 dB may be applied to each of the two PUSCHs without UCI on the second uplink carrier, since each of the two PUSCHs without UCI on the second uplink carrier may have a lower priority as compared to the PUSCH without UCI on the first uplink carrier. In some aspects, the power scaling for uplink carrier aggregation with the relative offset may be performed at the symbol level based at least in part on a UE capability.

At T1, the first half of the PUSCH without UCI on the first uplink carrier may have the equal priority as compared to the PUSCH without UCI on the second uplink carrier. In this case, the power offset Δ of zero may be applied for the first half of the PUSCH without UCI on the first uplink carrier and the PUSCH without UCI on the second uplink carrier. The second half of the PUSCH without UCI on the first uplink carrier may have a lower priority than the PUSCH with UCI on the second uplink carrier, so the power offset Δ of −3 dB may be applied to the second half of the PUSCH without UCI on the first uplink carrier. In other words, the power scaling may change during the middle of the PUSCH without UCI on the first uplink carrier starting from T1.

As shown by reference number 1306, at T0, the power scaling for uplink carrier aggregation with the relative offset may be performed at a slot/symbol level, where the power scaling may be fixed during the slot/subframe. For example, the power offset Δ of −3 dB may be applied to each of the two PUSCHs without UCI on the second uplink carrier, which may have a lower priority than the PUSCH with UCI on the first uplink carrier. In some aspects, the power scaling for uplink carrier aggregation with the relative offset may be performed at the slot/symbol level based at least in part on the UE capability.

At T1, the first half of the PUSCH without UCI on the first uplink carrier may have the equal priority as compared to the PUSCH without UCI on the second uplink carrier, so the power offset Δ of zero may be applied for the first half of the PUSCH without UCI on the first uplink carrier and the PUSCH without UCI on the second uplink carrier. In this example, the power offset Δ may be determined at a beginning of the slot/subframe, and may continue to an end of the slot/subframe. As a result, the power offset Δ of zero may also be applied for the second half of the PUSCH without UCI on the first uplink carrier and the PUSCH with UCI on the second uplink carrier. The power offset Δ of zero may continue to the end of the slot/subframe. In other words, the power scaling may be fixed during the slot/subframe.

As indicated above, FIG. 13 is provided as an example. Other examples may differ from what is described with regard to FIG. 13.

In some aspects, the UE may perform more than two concurrent uplink transmissions (e.g., three concurrent uplink transmissions). In some aspects, the power offset Δ may be used as $P_{ULx} = \delta P_{req\_ULx}$ where x=2, 3, . . . . In this case, UL1 may have a higher priority, as compared to U2, U3, and so on. The UE may determine a power scaling factor K, such that $K \times \{P_{req\_UL1} + \delta \times P_{req\_UL2} + \delta \times P_{req\_UL3} + \ldots\} = P_{tot}$. The UE may determine $P_{UL1}$, $P_{UL2}$, $P_{UL3}$, and so on accordingly.

In some aspects, the power offset Δ may be used as $P_{ULx} = \delta P_{req\_UL1}$ where x=2, 3, . . . . In this case, UL1 may have a higher priority, as compared to U2, U3, and so on. The UE may determine a temporary power level for $P_{ULx}$ ($P_{ULx\_tmp}$) according to: $P_{ULx\_tmp} = \min\{P_{req\_ULx}, \delta \times P_{req\_UL1}\}$ where x=2, 3, . . . . The UE may determine a power scaling factor K, such that $K \times \{P_{req\_UL1} + P_{UL2\_tmp} + P_{UL3\_tmp} + \ldots\} = P_{tot}$. The UE may determine $P_{UL1}$, $P_{UL2}$, $P_{UL3}$, and so on accordingly.

In some aspects, the power offset Δ may be used as $P_{ULx} = \delta P_{max\_UL2}$ where x=2, 3, . . . , and where $P_{max\_UL2}$ may be a maximum available power for an ULx transmission on a carrier when there is no concurrent uplink transmission(s). In this case, UL1 may have a higher priority, as compared to U2, U3, and so on. The UE may determine a power scaling factor K, such that $K \times \{P_{req\_UL1} + \delta \times P_{req\_UL2} + \delta \times P_{req\_UL3} + \ldots\} = P_{tot}$. The UE may determine $P_{UL1}$, $P_{UL2}$, $P_{UL3}$, and so on accordingly.

FIG. 14 is a diagram illustrating an example 1400 associated with power scaling for uplink carrier aggregation with a power offset, in accordance with the present disclosure.

A UE may concurrently perform a first uplink transmission (UL1), a second uplink transmission (UL2), and a third uplink transmission (UL3).

As shown by reference number 1402, a total power of $P_{req\_UL1}$, $P_{req\_UL2}$, and $P_{req\_UL3}$ may exceed $P_{tot}$. UL1 may have a higher priority as compared to UL2 and UL3. The UE may determine a power scaling factor K, such that $K \times \{P_{req\_UL1} \times \delta \times P_{req\_UL2} + \delta \times P_{req\_UL3} + \ldots\} = P_{tot}$. The UE may determine $P_{UL1}$, $P_{UL2}$, $P_{UL3}$, and so on accordingly.

As shown by reference number 1404, a total power of $P_{req\_UL1}$, $P_{req\_UL2}$, and $P_{req\_UL3}$ may exceed $P_{tot}$. UL1 may have a higher priority as compared to UL2 and UL3. The UE may determine a temporary power level for $P_{ULx}$ ($P_{ULx\_tmp}$) according to: $P_{ULx\_tmp} = \min\{P_{req\_ULx}, \delta \times P_{req\_UL1}\}$ where x=2, 3, .... The UE may determine a power scaling factor K, such that $K \times \{P_{req\_UL1} + P_{UL2\_tmp} + P_{UL3\_tmp} + \ldots\} = P_{tot}$. The UE may determine $P_{UL1}$, $P_{UL2}$, $P_{UL3}$, and so on accordingly.

As shown by reference number 1406, a total power of $P_{req\_UL1}$, $P_{req\_UL2}$, and $P_{req\_UL3}$ may exceed $P_{tot}$. The UE may not change a value for $P_{req\_UL1}$. The UE may modify $P_{req\_UL2}$ to be $\delta P_{max\_UL2}$. The UE may modify $P_{req\_UL3}$ to be $\delta P_{max\_UL3}$. UL1 may have a higher priority as compared to UL2 and UL3. The UE may determine a power scaling factor K, such that $K \times \{P_{req\_UL1} + \delta \times P_{max\_UL2} + \delta \times P_{max\_UL3} + \ldots\} = P_{tot}$. The UE may determine $P_{UL1}$, $P_{UL2}$, $P_{UL3}$, and so on accordingly.

As indicated above, FIG. 14 is provided as an example. Other examples may differ from what is described with regard to FIG. 14.

In some aspects, more than one concurrent uplink transmission may be associated with a higher priority. In some aspects, the power offset Δ may not be applied for a plurality of concurrent uplink transmissions with the higher priority. In some aspects, the power offset Δ may not be applied for an uplink transmission with a higher priority on a particular carrier (e.g., a lowest cell index).

In some aspects, a reference uplink for other carriers to apply the power offset Δ may be an uplink with a higher priority and with a larger/lower power level. In some aspects, the reference uplink for the other carriers to apply the power offset Δ may be an uplink with a higher priority on a particular carrier (e.g., lowest cell index). In some aspects, the reference uplink for the other carriers to apply the power offset Δ may be based at least in part on a UE selection.

FIG. 15 is a diagram illustrating an example 1500 associated with power scaling for uplink carrier aggregation with a power offset, in accordance with the present disclosure.

A UE may concurrently perform a first uplink transmission (UL1), a second uplink transmission (UL2), and a third uplink transmission (UL3), where UL1, UL2, and/or UL3 may all be associated with a higher priority.

As shown by reference number 1502, UL1 and UL2 may both be associated with the higher priority, and UL3 may be associated with a lower priority, relative to UL1 and UL2. Although both UL1 and UL2 may be associated with the higher priority, the power offset Δ may not be applied to both UL1 and UL2. For example, the power offset Δ may not be applied to a particular uplink transmission on a particular carrier (UL1), but the power offset Δ may be applied to UL2 with the same higher priority as compared to UL1.

As shown by reference number 1504, UL1 and UL2 may both be associated with the higher priority, and UL3 may be associated with a lower priority, relative to UL1 and UL2. As an example, a reference uplink for other carriers to apply the power offset Δ may be an uplink with the higher priority and with a larger power level (e.g., UL1). In this case, a UE may apply the power offset Δ associated with UL1 to UL2 and UL3.

As indicated above, FIG. 15 is provided as an example. Other examples may differ from what is described with regard to FIG. 15.

Figure 16:
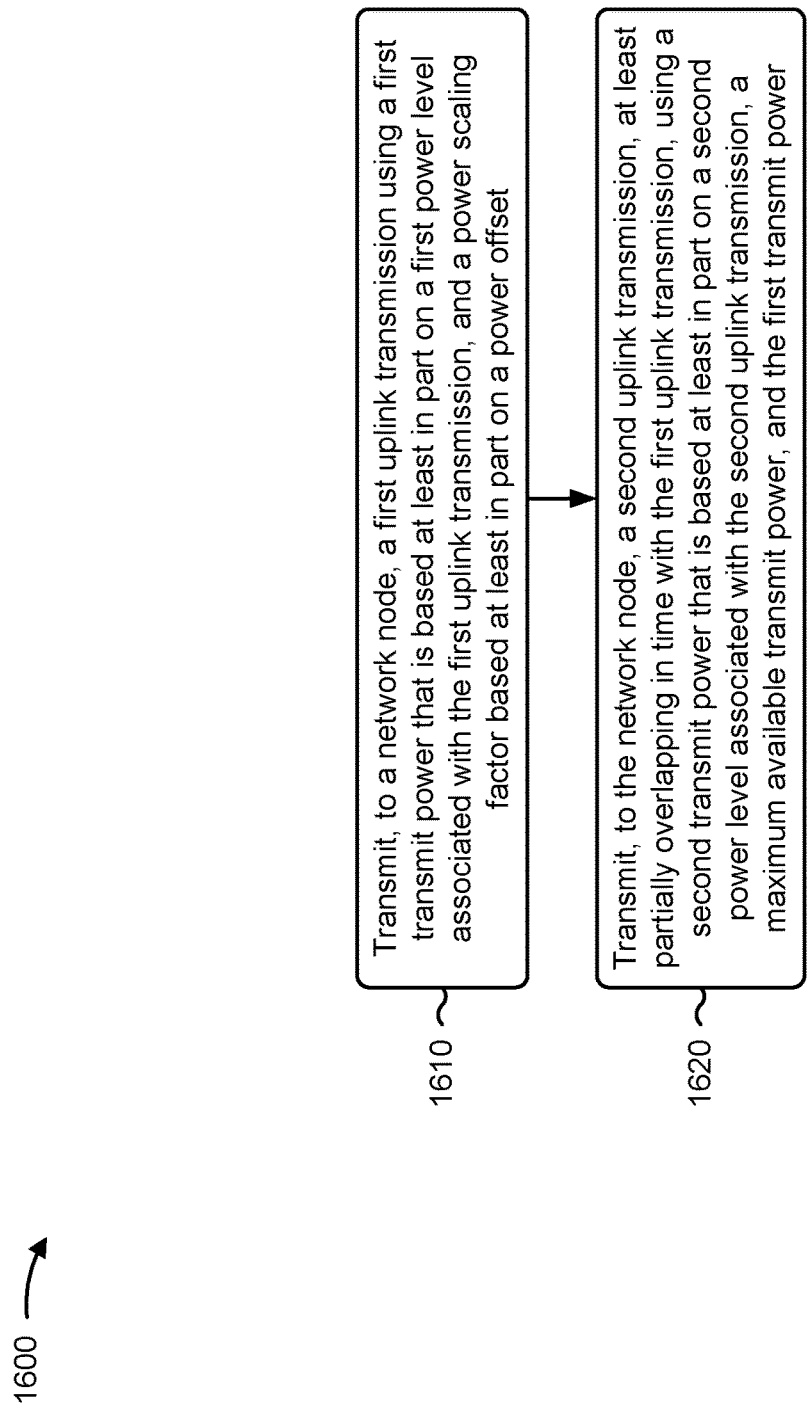
FIGS. 16-17 are diagrams illustrating example processes associated with power scaling for uplink carrier aggregation with a power offset, in accordance with the present disclosure.

FIG. 16 is a diagram illustrating an example process 1600 performed, for example, by a UE, in accordance with the present disclosure. Example process 1600 is an example where the UE (e.g., UE 120) performs operations associated with transmitting overlapping uplink transmissions using a power scaling factor.

As shown in FIG. 16, in some aspects, process 1600 may include transmitting, to a network node, a first uplink transmission using a first transmit power that is based at least in part on: a first power level associated with the first uplink transmission, and a power scaling factor based at least in part on a power offset (block 1610). For example, the UE (e.g., using communication manager 140 and/or transmission component 1804, depicted in FIG. 18) may transmit, to a network node, a first uplink transmission using a first transmit power that is based at least in part on: a first power level associated with the first uplink transmission, and a power scaling factor based at least in part on a power offset, as described above.

As further shown in FIG. 16, in some aspects, process 1600 may include transmitting, to the network node, a second uplink transmission, at least partially overlapping in time with the first uplink transmission, using a second transmit power that is based at least in part on: a second power level associated with the second uplink transmission, a maximum available transmit power, and the first transmit power (block 1620). For example, the UE (e.g., using communication manager 140 and/or transmission component 1804, depicted in FIG. 18) may transmit, to the network node, a second uplink transmission, at least partially overlapping in time with the first uplink transmission, using a second transmit power that is based at least in part on: a second power level associated with the second uplink transmission, a maximum available transmit power, and the first transmit power, as described above.

Process 1600 may include additional aspects, such as any single aspect or any combination of aspects described below and/or in connection with one or more other processes described elsewhere herein.

In a first aspect, process 1600 includes determining that a total of the first power level and the second power level exceeds the maximum available transmit power, and scaling the total of the first power level and the second power level to obtain the first transmit power associated with the first uplink transmission and the second transmit power associated with the second uplink transmission.

In a second aspect, alone or in combination with the first aspect, the maximum available transmit power for the UE corresponds to a total available power for the UE across frequencies over a frequency range.

In a third aspect, alone or in combination with one or more of the first and second aspects, the maximum available transmit power for the UE corresponds to a total available power for the UE across carriers over a frequency band.

In a fourth aspect, alone or in combination with one or more of the first through third aspects, the maximum available transmit power for the UE corresponds to a total available power for the UE across a group of frequency bands.

In a fifth aspect, alone or in combination with one or more of the first through fourth aspects, process 1600 includes receiving, from the network node, an indication of the power offset, via RRC signaling, a MAC-CE, or DCI, and applying the power offset to the second uplink transmission.

In a sixth aspect, alone or in combination with one or more of the first through fifth aspects, process 1600 includes determining the power scaling factor based at least in part on the first power level, the power offset, the second power level, and the maximum available transmit power.

In a seventh aspect, alone or in combination with one or more of the first through sixth aspects, process 1600 includes determining the first transmit power based at least in part on a minimum of the first power level, the power scaling factor, and the first power level.

In an eighth aspect, alone or in combination with one or more of the first through seventh aspects, process 1600 includes determining the second transmit power based at least in part on a minimum of the second power level, and a difference between the maximum available transmit power and the first transmit power.

In a ninth aspect, alone or in combination with one or more of the first through eighth aspects, process 1600 includes determining a temporary power level based at least in part on a minimum of the second power level, the power offset, and the first power level; and determining the power scaling factor based at least in part on the first power level, the temporary power level, and the maximum available transmit power.

In a tenth aspect, alone or in combination with one or more of the first through ninth aspects, process 1600 includes determining a temporary power level based at least in part on a minimum of the second power level, the power offset, and a maximum available power for the second uplink transmission; and determining the power scaling factor based at least in part on the first power level, the temporary power level, and the maximum available transmit power.

In an eleventh aspect, alone or in combination with one or more of the first through tenth aspects, the first uplink transmission is associated with a first uplink carrier and the second uplink transmission is associated with a second uplink carrier, and further comprising receiving, from the network node, a configuration of the power offset for the second uplink carrier; and applying the power offset to the second uplink transmission associated with the second uplink carrier irrespective of a power allocation priority between the second uplink transmission and the first uplink transmission.

In a twelfth aspect, alone or in combination with one or more of the first through eleventh aspects, process 1600 includes receiving, from the network node, a configuration of the power offset for an uplink carrier aggregation; and applying the power offset to the first uplink transmission or the second uplink transmission based at least in part on a power allocation priority between the first uplink transmission and the second uplink transmission.

In a thirteenth aspect, alone or in combination with one or more of the first through twelfth aspects, the power allocation priority indicates an equal priority level between the first uplink transmission and the second uplink transmission, and applying the power offset comprises applying the power offset to the first uplink transmission or the second uplink transmission based at least in part on a first index associated with the first uplink carrier and a second index associated with the second uplink carrier.

In a fourteenth aspect, alone or in combination with one or more of the first through thirteenth aspects, the power allocation priority indicates an equal priority level between the first uplink transmission and the second uplink transmission; and applying the power offset comprises applying a smaller power offset as compared to power offsets applied to uplink transmissions associated with different priority levels.

In a fifteenth aspect, alone or in combination with one or more of the first through fourteenth aspects, a first TTI associated with the first uplink transmission is not aligned with a second TTI associated with the second uplink transmission, and further comprising applying the power offset to the first uplink transmission or the second uplink transmission at a symbol level based at least in part on a (pre)-configuration, wherein a power scaling changes during the first uplink transmission or the second uplink transmission based at least in part on a power allocation priority.

In a sixteenth aspect, alone or in combination with one or more of the first through fifteenth aspects, a first TTI associated with the first uplink transmission is not aligned with a second TTI associated with the second uplink transmission, and further comprising applying the power offset to the first uplink transmission or the second uplink transmission at a slot level or at a subframe level based at least in part on a (pre)-configuration, wherein a power scaling is fixed during a slot or subframe.

In a seventeenth aspect, alone or in combination with one or more of the first through sixteenth aspects, process 1600 includes determining, based at least in part on a plurality of uplink transmissions including the first uplink transmission and the second uplink transmission, the power scaling factor based at least in part on the first power level, the power offset multiplied by each of a plurality of power levels associated with the plurality of uplink transmissions, and the maximum available transmit power; and determining the first transmit power and the second transmit power based at least in part on the power scaling factor.

In an eighteenth aspect, alone or in combination with one or more of the first through seventeenth aspects, process 1600 includes determining, based at least in part on a plurality of uplink transmissions including the first uplink transmission and the second uplink transmission, the power scaling factor based at least in part on the first power level, the power offset multiplied by the first power level for each of the plurality of uplink transmissions, and the maximum available transmit power; and determining the first transmit power and the second transmit power based at least in part on the power scaling factor.

In a nineteenth aspect, alone or in combination with one or more of the first through eighteenth aspects, process 1600 includes determining, based at least in part on a plurality of uplink transmissions including the first uplink transmission and the second uplink transmission, the power scaling factor based at least in part on the first power level, the power offset multiplied by each of a plurality of maximum available powers associated with the plurality of uplink transmissions, and the maximum available transmit power; and determining the first transmit power and the second transmit power based at least in part on the power scaling factor.

In a twentieth aspect, alone or in combination with one or more of the first through nineteenth aspects, process 1600 includes determining to not apply the power offset to the first uplink transmission or the second uplink transmission based at least in part on one or more of a priority level associated with the first uplink transmission or a priority level associated with the second uplink transmission, or a first index of a first uplink carrier associated with the first uplink transmission or second index of a second uplink carrier associated with the second uplink transmission.

In a twenty-first aspect, alone or in combination with one or more of the first through twentieth aspects, process 1600 includes determining, for a plurality of uplink transmissions including the first uplink transmission and the second uplink transmission, a priority level for each of the plurality of uplink transmissions; and applying the power offset to one or more of the plurality of uplink transmissions, wherein the power offset is based at least in part on a reference uplink transmission from the plurality of uplink transmissions, and the reference uplink transmission is associated with a higher priority level as compared to other uplink transmissions of the plurality of uplink transmissions.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
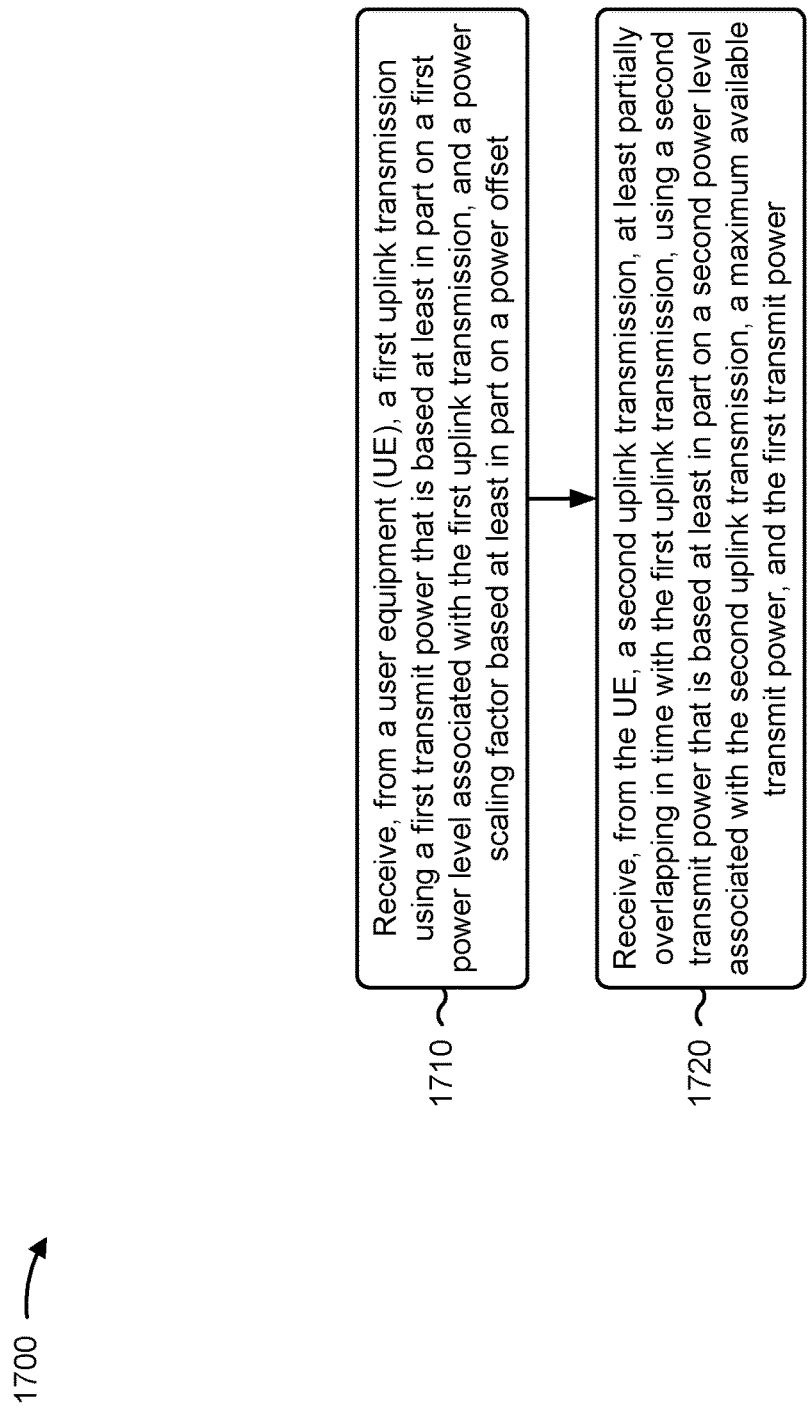

FIG. 17 is a diagram illustrating an example process 1700 performed, for example, by a network node, in accordance with the present disclosure. Example process 1700 is an example where the network node (e.g., base station 110) performs operations associated with transmitting overlapping uplink transmissions using a power scaling factor.

As shown in FIG. 17, in some aspects, process 1700 may include receiving, from a UE, a first uplink transmission using a first transmit power that is based at least in part on: a first power level associated with the first uplink transmission, and a power scaling factor based at least in part on a power offset (block 1710). For example, the network node (e.g., using communication manager 150 and/or reception component 1902, depicted in FIG. 19) may receive, from a UE, a first uplink transmission using a first transmit power that is based at least in part on: a first power level associated with the first uplink transmission, and a power scaling factor based at least in part on a power offset, as described above.

As further shown in FIG. 17, in some aspects, process 1700 may include receiving, from the UE, a second uplink transmission, at least partially overlapping in time with the first uplink transmission, using a second transmit power that is based at least in part on: a second power level associated with the second uplink transmission, a maximum available transmit power, and the first transmit power (block 1720). For example, the network node (e.g., using communication manager 150 and/or reception component 1902, depicted in FIG. 19) may receive, from the UE, a second uplink transmission, at least partially overlapping in time with the first uplink transmission, using a second transmit power that is based at least in part on: a second power level associated with the second uplink transmission, a maximum available transmit power, and the first transmit power, as described above.

Process 1700 may include additional aspects, such as any single aspect or any combination of aspects described below and/or in connection with one or more other processes described elsewhere herein.

In a first aspect, the maximum available transmit power for the UE corresponds to a total available power for the UE across frequencies over a frequency range.

In a second aspect, alone or in combination with the first aspect, the maximum available transmit power for the UE corresponds to a total available power for the UE across carriers over a frequency band.

In a third aspect, alone or in combination with one or more of the first and second aspects, the maximum available transmit power for the UE corresponds to a total available power for the UE across a group of frequency bands.

In a fourth aspect, alone or in combination with one or more of the first through third aspects, process 1700 includes transmitting, to the UE, an indication of the power offset, via RRC signaling, a MAC-CE, or DCI.

In a fifth aspect, alone or in combination with one or more of the first through fourth aspects, the power scaling factor is based at least in part on the first power level, the power offset, the second power level, and the maximum available transmit power.

In a sixth aspect, alone or in combination with one or more of the first through fifth aspects, the first transmit power is based at least in part on a minimum of the first power level, the power scaling factor, and the first power level.

In a seventh aspect, alone or in combination with one or more of the first through sixth aspects, the second transmit power is based at least in part on a minimum of the second power level, and a difference between the maximum available transmit power and the first transmit power.

In an eighth aspect, alone or in combination with one or more of the first through seventh aspects, a temporary power level is based at least in part on a minimum of the second power level, the power offset, and the first power level; and the power scaling factor is based at least in part on the first power level, the temporary power level, and the maximum available transmit power.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
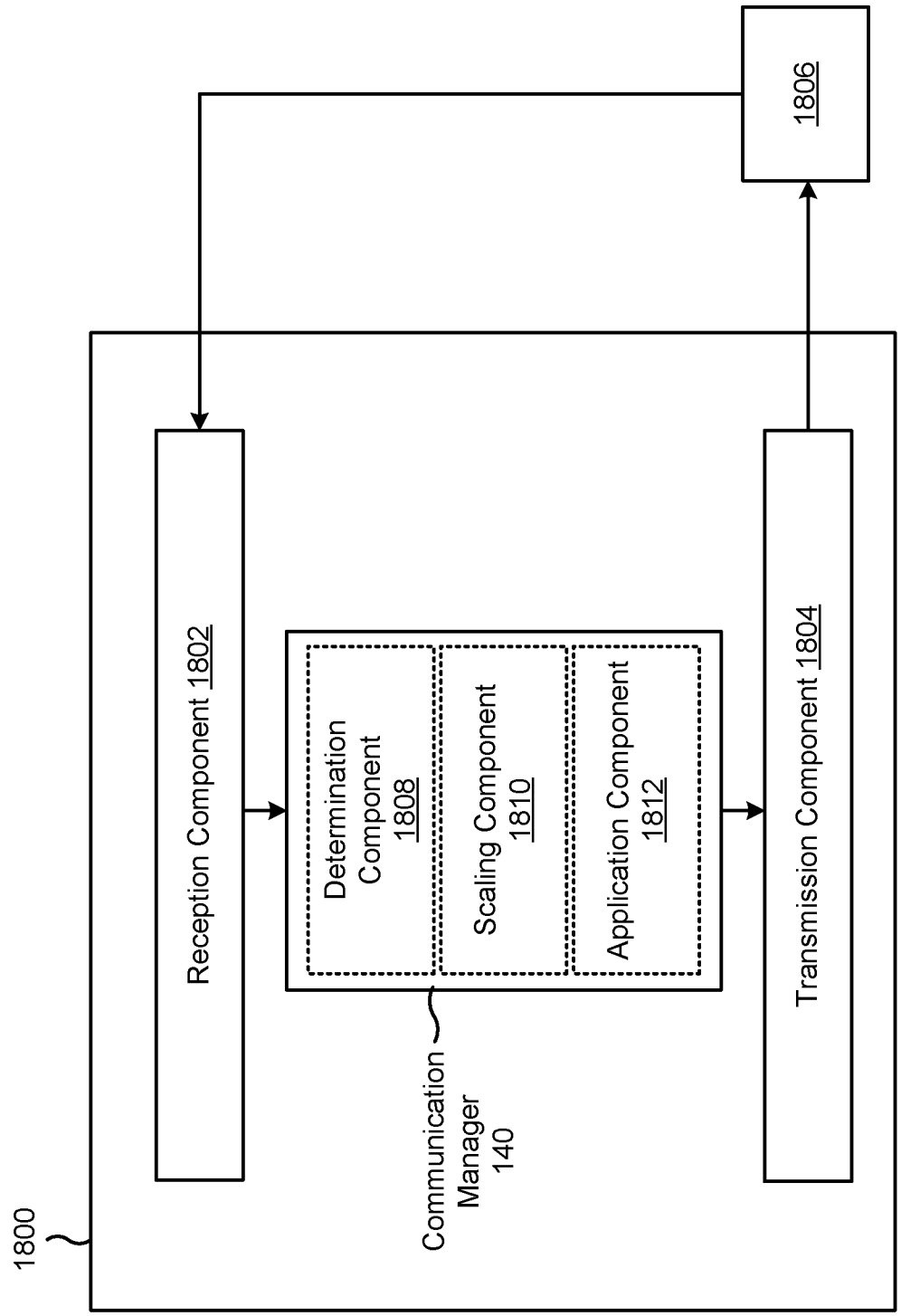
FIGS. 18-19 are diagrams of example apparatuses for wireless communication, in accordance with the present disclosure.

FIG. 18 is a diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 140. The communication manager 140 may include one or more of a determination component 1808, a scaling component 1810, or an application component 1812, among other examples.

In some aspects, the apparatus 1800 may be configured to perform one or more operations described herein in connection with FIGS. 5-15. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the UE described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the UE described in connection with FIG. 2. In some aspects, the transmission component 1804 may be co-located with the reception component 1802 in a transceiver.

The transmission component 1804 may transmit, to a network node, a first uplink transmission using a first transmit power that is based at least in part on a first power level associated with the first uplink transmission, and a power scaling factor based at least in part on a power offset. The transmission component 1804 may transmit, to the network node, a second uplink transmission, at least partially overlapping in time with the first uplink transmission, using a second transmit power that is based at least in part on a second power level associated with the second uplink transmission, a maximum available transmit power, and the first transmit power.

The determination component 1808 may determine that a total of the first power level and the second power level exceeds the maximum available transmit power. The scaling component 1810 may scale the total of the first power level and the second power level to obtain the first transmit power associated with the first uplink transmission and the second transmit power associated with the second uplink transmission.

The reception component 1802 may receive, from the network node, an indication of the power offset, via RRC signaling, a MAC-CE, or DCI information. The application component 1812 may apply the power offset to the second uplink transmission.

The determination component 1808 may determine the power scaling factor based at least in part on the first power level, the power offset, the second power level, and the maximum available transmit power. The determination component 1808 may determine the first transmit power based at least in part on a minimum of: the first power level, the power scaling factor, and the first power level. The determination component 1808 may determine the second transmit power based at least in part on a minimum of: the second power level, and a difference between the maximum available transmit power and the first transmit power. The determination component 1808 may determine a temporary power level based at least in part on a minimum of: the second power level, the power offset, and the first power level. The determination component 1808 may determine the power scaling factor based at least in part on the first power level, the temporary power level, and the maximum available transmit power. The determination component 1808 may determine a temporary power level based at least in part on a minimum of: the second power level, the power offset, and a maximum available power for the second uplink transmission. The determination component 1808 may determine the power scaling factor based at least in part on the first power level, the temporary power level, and the maximum available transmit power.

The reception component 1802 may receive, from the network node, a configuration of the power offset for an uplink carrier aggregation. The application component 1812 may apply the power offset to the first uplink transmission or the second uplink transmission based at least in part on a power allocation priority between the first uplink transmission and the second uplink transmission.

The determination component 1808 may determine, based at least in part on a plurality of uplink transmissions including the first uplink transmission and the second uplink transmission, the power scaling factor based at least in part on the first power level, the power offset multiplied by each of a plurality of power levels associated with the plurality of uplink transmissions, and the maximum available transmit power. The determination component 1808 may determine the first transmit power and the second transmit power based at least in part on the power scaling factor.

The determination component 1808 may determine, based at least in part on a plurality of uplink transmissions including the first uplink transmission and the second uplink transmission, the power scaling factor based at least in part on the first power level, the power offset multiplied by the first power level for each of the plurality of uplink transmissions, and the maximum available transmit power. The determination component 1808 may determine the first transmit power and the second transmit power based at least in part on the power scaling factor.

The determination component 1808 may determine, based at least in part on a plurality of uplink transmissions including the first uplink transmission and the second uplink transmission, the power scaling factor based at least in part on the first power level, the power offset multiplied by each of a plurality of maximum available powers associated with the plurality of uplink transmissions, and the maximum available transmit power. The determination component 1808 may determine the first transmit power and the second transmit power based at least in part on the power scaling factor.

The determination component 1808 may determine to not apply the power offset to the first uplink transmission or the second uplink transmission based at least in part on one or more of: a priority level associated with the first uplink transmission or a priority level associated with the second uplink transmission, or a first index of a first uplink carrier associated with the first uplink transmission or second index of a second uplink carrier associated with the second uplink transmission.

The determination component 1808 may determine, for a plurality of uplink transmissions including the first uplink transmission and the second uplink transmission, a priority level for each of the plurality of uplink transmissions. The application component 1812 may apply the power offset to one or more of the plurality of uplink transmissions, wherein the power offset is based at least in part on a reference uplink transmission from the plurality of uplink transmissions, and wherein the reference uplink transmission is associated with a higher priority level as compared to other uplink transmissions of the plurality of uplink transmissions.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
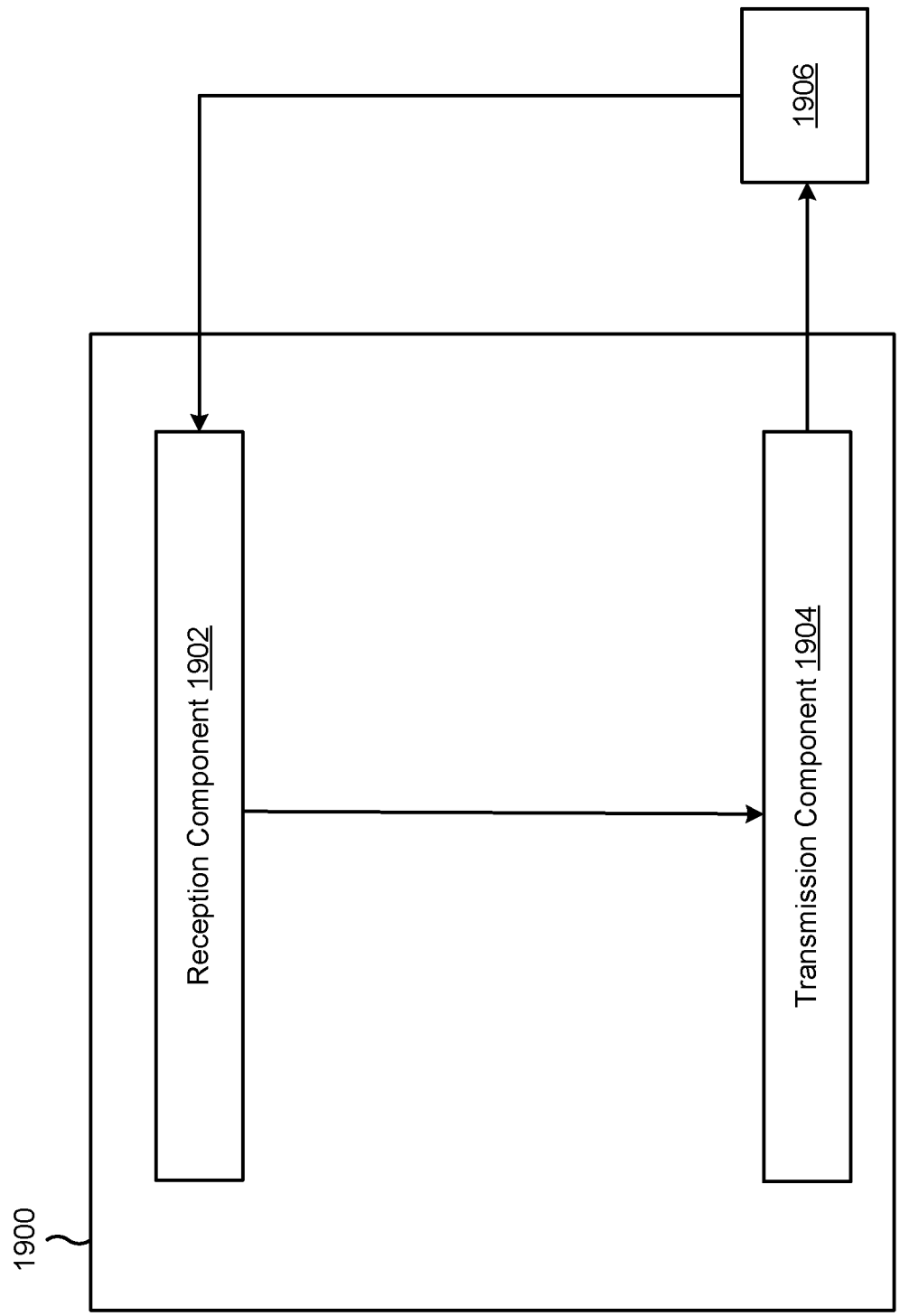

FIG. 19 is a diagram of an example apparatus 1900 for wireless communication. The apparatus 1900 may be a network node, or a network node may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904.

In some aspects, the apparatus 1900 may be configured to perform one or more operations described herein in connection with FIGS. 5-15. Additionally, or alternatively, the apparatus 1900 may be configured to perform one or more processes described herein, such as process 1700 of FIG. 17. In some aspects, the apparatus 1900 and/or one or more components shown in FIG. 19 may include one or more components of the base station described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the base station described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modem, a modulator, a transmit MIMO processor, a transmit processor, a controller/processor, a memory, or a combination thereof, of the base station described in connection with FIG. 2. In some aspects, the transmission component 1904 may be co-located with the reception component 1902 in a transceiver.

The reception component 1902 may receive, from a UE, a first uplink transmission using a first transmit power that is based at least in part on a first power level associated with the first uplink transmission, and a power scaling factor based at least in part on a power offset. The reception component 1902 may receive, from the UE, a second uplink transmission, at least partially overlapping in time with the first uplink transmission, using a second transmit power that is based at least in part on a second power level associated with the second uplink transmission, a maximum available transmit power, and the first transmit power. The transmission component 1904 may transmit, to the UE, an indication of the power offset, via RRC, a MAC-CE, or DCI.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
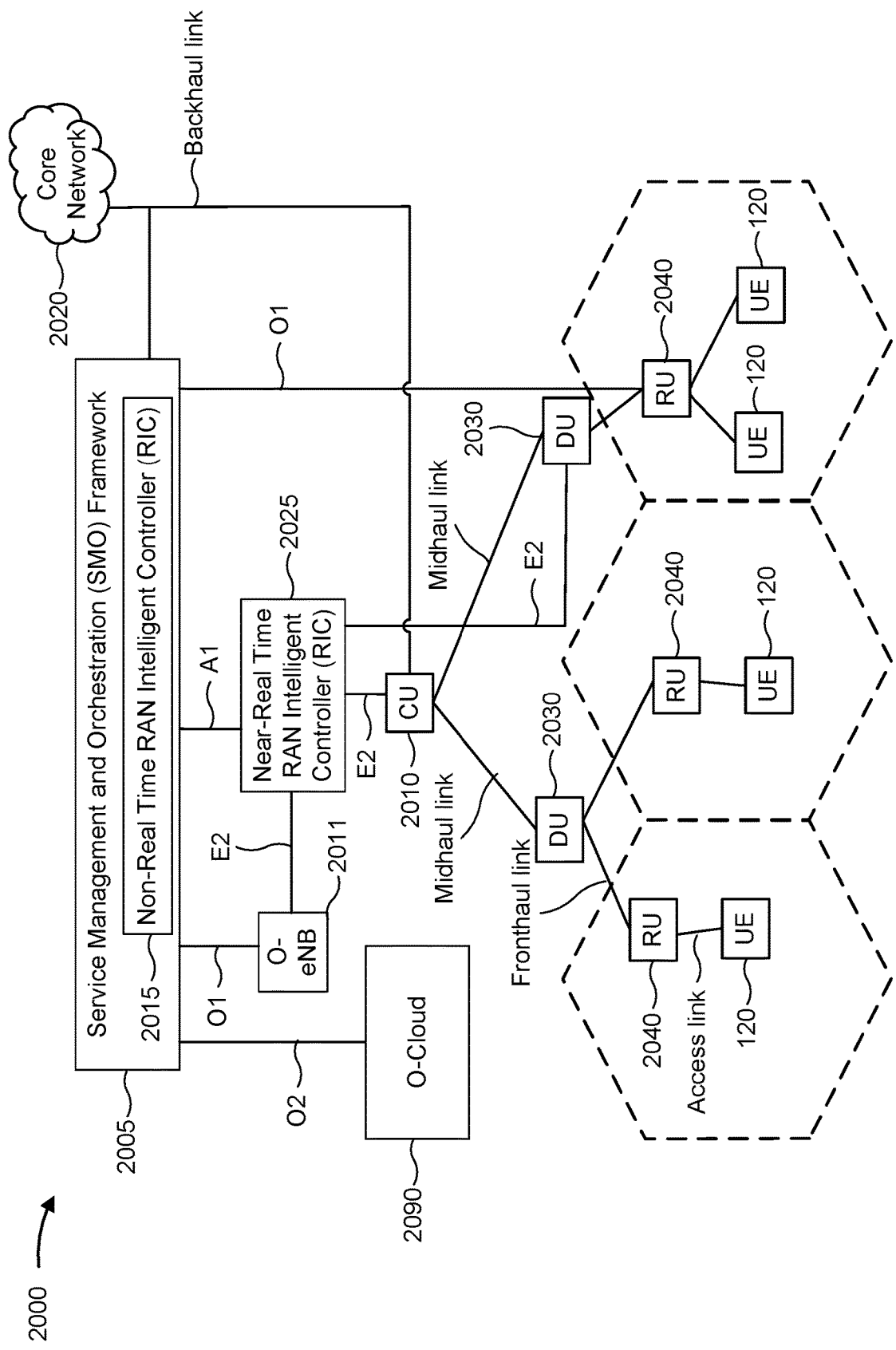
FIG. 20 is a diagram illustrating an example of a disaggregated base station architecture, in accordance with the present disclosure.

FIG. 20 is a diagram illustrating an example 2000 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 20 may include one or more CUs 2010 that can communicate directly with a core network 2020 via a backhaul link, or indirectly with the core network 2020 through one or more disaggregated base station units (such as a Near-RT MC 2025 via an E2 link, or a Non-RT RIC 2015 associated with a Service Management and Orchestration (SMO) Framework 2005, or both). A CU 2010 may communicate with one or more DUs 2030 via respective midhaul links, such as an F1 interface. The DUs 2030 may communicate with one or more RUs 2040 via respective fronthaul links. The RUs 2040 may communicate with respective UEs 120 via one or more radio frequency (RF) access links. In some implementations, the UE 120 may be simultaneously served by multiple RUs 2040.

Each of the units (e.g., the CUs 2010, the DUs 2030, the RUs 2040), as well as the Near-RT RICs 2025, the Non-RT RICs 2015, and the SMO Framework 2005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 2010 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 2010. The CU 2010 may be configured to handle user plane functionality (e.g., Central Unit—User Plane (CU-UP)), control plane functionality (e.g., Central Unit—Control Plane (CU-CP)), or a combination thereof. In some implementations, the CU 2010 can be logically split into one or more CU-UP units and one or more CU-CP units. The CU-UP unit can communicate bidirectionally with the CU-CP unit via an interface, such as the E1 interface when implemented in an O-RAN configuration. The CU 2010 can be implemented to communicate with the DU 2030, as necessary, for network control and signaling.

The DU 2030 may correspond to a logical unit that includes one or more base station functions to control the operation of one or more RUs 2040. In some aspects, the DU 2030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 2030 may further host one or more low-PHY layers. Each layer (or module) can be implemented with an interface configured to communicate signals with other layers (and modules) hosted by the DU 2030, or with the control functions hosted by the CU 2010.

Lower-layer functionality can be implemented by one or more RUs 2040. In some deployments, an RU 2040, controlled by a DU 2030, may correspond to a logical node that hosts RF processing functions, or low-PHY layer functions (such as performing fast Fourier transform (FFT), inverse FFT (iFFT), digital beamforming, PRACH extraction and filtering, or the like), or both, based at least in part on the functional split, such as a lower layer functional split. In such an architecture, the RU(s) 2040 can be implemented to handle over the air (OTA) communication with one or more UEs 120. In some implementations, real-time and non-real-time aspects of control and user plane communication with the RU(s) 2040 can be controlled by the corresponding DU 2030. In some scenarios, this configuration can enable the DU(s) 2030 and the CU 2010 to be implemented in a cloud-based RAN architecture, such as a vRAN architecture.

The SMO Framework 2005 may be configured to support RAN deployment and provisioning of non-virtualized and virtualized network elements. For non-virtualized network elements, the SMO Framework 2005 may be configured to support the deployment of dedicated physical resources for RAN coverage requirements which may be managed via an operations and maintenance interface (such as an O1 interface). For virtualized network elements, the SMO Framework 2005 may be configured to interact with a cloud computing platform (such as an open cloud (O-Cloud) 2090) to perform network element life cycle management (such as to instantiate virtualized network elements) via a cloud computing platform interface (such as an O2 interface). Such virtualized network elements can include, but are not limited to, CUs 2010, DUs 2030, RUs 2040 and Near-RT RICs 2025. In some implementations, the SMO Framework 2005 can communicate with a hardware aspect of a 4G RAN, such as an open eNB (O-eNB) 2011, via an O1 interface. Additionally, in some implementations, the SMO Framework 2005 can communicate directly with one or more RUs 2040 via an O1 interface. The SMO Framework 2005 also may include a Non-RT RIC 2015 configured to support functionality of the SMO Framework 2005.

The Non-RT RIC 2015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2025. The Non-RT RIC 2015 may be coupled to or communicate with (such as via an A1 interface) the Near-RT RIC 2025. The Near-RT RIC 2025 may be configured to include a logical function that enables near-real-time control and optimization of RAN elements and resources via data collection and actions over an interface (such as via an E2 interface) connecting one or more CUs 2010, one or more DUs 2030, or both, as well as an O-eNB, with the Near-RT RIC 2025.

In some implementations, to generate AI/ML models to be deployed in the Near-RT RIC 2025, the Non-RT RIC 2015 may receive parameters or external enrichment information from external servers. Such information may be utilized by the Near-RT RIC 2025 and may be received at the SMO Framework 2005 or the Non-RT RIC 2015 from non-network data sources or from network functions. In some examples, the Non-RT RIC 2015 or the Near-RT RIC 2025 may be configured to tune RAN behavior or performance. For example, the Non-RT RIC 2015 may monitor long-term trends and patterns for performance and employ AI/ML models to perform corrective actions through the SMO Framework 2005 (such as reconfiguration via O1) or via creation of RAN management policies (such as A1 policies).

As indicated above, FIG. 20 is provided as an example. Other examples may differ from what is described with regard to FIG. 20.

The following provides an overview of some Aspects of the present disclosure:

Aspect 1: A method of wireless communication performed by a user equipment (UE), comprising: transmitting, to a network node, a first uplink transmission using a first transmit power that is based at least in part on: a first power level associated with the first uplink transmission, and a power scaling factor based at least in part on a power offset; and transmitting, to the network node, a second uplink transmission, at least partially overlapping in time with the first uplink transmission, using a second transmit power that is based at least in part on: a second power level associated with the second uplink transmission, a maximum available transmit power, and the first transmit power.

Aspect 2: The method of Aspect 1, wherein a total of the first power level and the second power level exceeds the maximum available transmit power, and wherein the total of the first power level and the second power level is scaled to obtain the first transmit power associated with the first uplink transmission and the second transmit power associated with the second uplink transmission.

Aspect 3: The method of any of Aspects 1 through 2, wherein the maximum available transmit power for the UE corresponds to a total available power for the UE across frequencies over a frequency range.

Aspect 4: The method of any of Aspects 1 through 3, wherein the maximum available transmit power for the UE corresponds to a total available power for the UE across carriers over a frequency band.

Aspect 5: The method of any of Aspects 1 through 4, wherein the maximum available transmit power for the UE corresponds to a total available power for the UE across a group of frequency bands.

Aspect 6: The method of any of Aspects 1 through 5, further comprising: receiving, from the network node, an indication of the power offset, via radio resource control signaling, a medium access control control element, or downlink control information, wherein the power offset is applied to the second uplink transmission.

Aspect 7: The method of any of Aspects 1 through 6, wherein the power scaling factor is based at least in part on the first power level, the power offset, the second power level, and the maximum available transmit power.

Aspect 8: The method of any of Aspects 1 through 7, wherein the first transmit power is based at least in part on a minimum of: the first power level, the power scaling factor, and the first power level.

Aspect 9: The method of any of Aspects 1 through 8, wherein the second transmit power is based at least in part on a minimum of: the second power level, and a difference between the maximum available transmit power and the first transmit power.

Aspect 10: The method of any of Aspects 1 through 9, wherein a temporary power level is based at least in part on a minimum of: the second power level, the power offset, and the first power level, and wherein the power scaling factor is based at least in part on the first power level, the temporary power level, and the maximum available transmit power.

Aspect 11: The method of any of Aspects 1 through 10, wherein a temporary power level is based at least in part on a minimum of: the second power level, the power offset, and a maximum available power for the second uplink transmission, and wherein the power scaling factor is based at least in part on the first power level, the temporary power level, and the maximum available transmit power.

Aspect 12: The method of any of Aspects 1 through 11, wherein the first uplink transmission is associated with a first uplink carrier and the second uplink transmission is associated with a second uplink carrier, wherein the one or more processors are further configured to: receive, from the network node, a configuration of the power offset for the second uplink carrier, wherein the power offset is applied to the second uplink transmission associated with the second uplink carrier irrespective of a power allocation priority between the second uplink transmission and the first uplink transmission Aspect 13: The method of any of Aspects 1 through 12, comprising: receiving, from the network node, a configuration of the power offset for an uplink carrier aggregation, wherein the power offset is applied to the first uplink transmission or the second uplink transmission based at least in part on a power allocation priority between the first uplink transmission and the second uplink transmission.

Aspect 14: The method of Aspect 13, wherein the power allocation priority indicates an equal priority level between the first uplink transmission and the second uplink transmission, and wherein the power offset is applied to the first uplink transmission or the second uplink transmission based at least in part on a first index associated with the first uplink transmission and a second index associated with the second uplink transmission.

Aspect 15: The method of Aspect 13, wherein the power allocation priority indicates an equal priority level between the first uplink transmission and the second uplink transmission, and wherein a smaller power offset is applied as compared to power offsets applied to uplink transmissions associated with different priority levels.

Aspect 16: The method of any of Aspects 1 through 15, wherein a first transmission time interval (TTI) associated with the first uplink transmission is not aligned with a second TTI associated with the second uplink transmission, wherein the power offset is applied to the first uplink transmission or the second uplink transmission at a symbol level based at least in part on a (pre)-configuration, and wherein a power scaling changes during the first uplink transmission or the second uplink transmission based at least in part on a power allocation priority.

Aspect 17: The method of any of Aspects 1 through 16, wherein a first transmission time interval (TTI) associated with the first uplink transmission is not aligned with a second TTI associated with the second uplink transmission, wherein the power offset is applied to the first uplink transmission or the second uplink transmission at a slot level or at a subframe level based at least in part on a (pre)-configuration, and wherein a power scaling is fixed during a slot or subframe.

Aspect 18: The method of any of Aspects 1 through 17, wherein, based at least in part on a plurality of uplink transmissions including the first uplink transmission and the second uplink transmission, the power scaling factor is based at least in part on the first power level, the power offset multiplied by each of a plurality of power levels associated with the plurality of uplink transmissions, and the maximum available transmit power, and wherein the first transmit power and the second transmit power is based at least in part on the power scaling factor.

Aspect 19: The method of any of Aspects 1 through 18, wherein, based at least in part on a plurality of uplink transmissions including the first uplink transmission and the second uplink transmission, the power scaling factor is based at least in part on the first power level, the power offset multiplied by the first power level for each of the plurality of uplink transmissions, and the maximum available transmit power, and wherein the first transmit power and the second transmit power is based at least in part on the power scaling factor.

Aspect 20: The method of any of Aspects 1 through 19, wherein, based at least in part on a plurality of uplink transmissions including the first uplink transmission and the second uplink transmission, the power scaling factor is based at least in part on the first power level, the power offset multiplied by each of a plurality of maximum available powers associated with the plurality of uplink transmissions, and the maximum available transmit power, and wherein the first transmit power and the second transmit power is based at least in part on the power scaling factor.

Aspect 21: The method of any of Aspects 1 through 20, wherein the power offset is not applied to the first uplink transmission or the second uplink transmission based at least in part on one or more of: a priority level associated with the first uplink transmission or a priority level associated with the second uplink transmission, or a first index of a first uplink carrier associated with the first uplink transmission or second index of a second uplink carrier associated with the second uplink transmission.

Aspect 22: The method of any of Aspects 1 through 21, wherein, for a plurality of uplink transmissions including the first uplink transmission and the second uplink transmission, a priority level is determined for each of the plurality of uplink transmissions, wherein the power offset is applied to one or more of the plurality of uplink transmissions, wherein the power offset is based at least in part on a reference uplink transmission from the plurality of uplink transmissions, and wherein the reference uplink transmission is associated with a higher priority level as compared to other uplink transmissions of the plurality of uplink transmissions.

Aspect 23: A method of wireless communication performed by a network node, comprising: receiving, from a user equipment (UE), a first uplink transmission using a first transmit power that is based at least in part on: a first power level associated with the first uplink transmission, and a power scaling factor based at least in part on a power offset; and receiving, from the UE, a second uplink transmission, at least partially overlapping in time with the first uplink transmission, using a second transmit power that is based at least in part on: a second power level associated with the second uplink transmission, a maximum available transmit power, and the first transmit power.

Aspect 24: The method of Aspect 23, wherein the maximum available transmit power for the UE corresponds to a total available power for the UE across frequencies over a frequency range.

Aspect 25: The method of any of Aspects 23 through 24, wherein the maximum available transmit power for the UE corresponds to a total available power for the UE across carriers over a frequency band.

Aspect 26: The method of any of Aspects 23 through 25, wherein the maximum available transmit power for the UE corresponds to a total available power for the UE across a group of frequency bands.

Aspect 27: The method of any of Aspects 23 through 26, further comprising: transmitting, to the UE, an indication of the power offset, via radio resource control signaling, a medium access control control element, or downlink control information.

Aspect 28: The method of any of Aspects 23 through 27, wherein the power scaling factor is based at least in part on the first power level, the power offset, the second power level, and the maximum available transmit power.

Aspect 29: The method of any of Aspects 23 through 28, wherein the first transmit power is based at least in part on a minimum of: the first power level, the power scaling factor, and the first power level.

Aspect 30: The method of any of Aspects 23 through 29, wherein the second transmit power is based at least in part on a minimum of: the second power level, and a difference between the maximum available transmit power and the first transmit power.

Aspect 31: The method of any of Aspects 23 through 30, wherein: a temporary power level is based at least in part on a minimum of: the second power level, the power offset, and the first power level; and the power scaling factor is based at least in part on the first power level, the temporary power level, and the maximum available transmit power.

Aspect 32: An apparatus for wireless communication at a device, comprising a processor; memory coupled with the processor; and instructions stored in the memory and executable by the processor to cause the apparatus to perform the method of one or more of Aspects 1-22.

Aspect 33: A device for wireless communication, comprising a memory and one or more processors coupled to the memory, the one or more processors configured to perform the method of one or more of Aspects 1-22.

Aspect 34: An apparatus for wireless communication, comprising at least one means for performing the method of one or more of Aspects 1-22.

Aspect 35: A non-transitory computer-readable medium storing code for wireless communication, the code comprising instructions executable by a processor to perform the method of one or more of Aspects 1-22.

Aspect 36: A non-transitory computer-readable medium storing a set of instructions for wireless communication, the set of instructions comprising one or more instructions that, when executed by one or more processors of a device, cause the device to perform the method of one or more of Aspects 1-22.

Aspect 37: An apparatus for wireless communication at a device, comprising a processor; memory coupled with the processor; and instructions stored in the memory and executable by the processor to cause the apparatus to perform the method of one or more of Aspects 23-31.

Aspect 38: A device for wireless communication, comprising a memory and one or more processors coupled to the memory, the one or more processors configured to perform the method of one or more of Aspects 23-31.

Aspect 39: An apparatus for wireless communication, comprising at least one means for performing the method of one or more of Aspects 23-31.

Aspect 40: A non-transitory computer-readable medium storing code for wireless communication, the code comprising instructions executable by a processor to perform the method of one or more of Aspects 23-31.

Aspect 41: A non-transitory computer-readable medium storing a set of instructions for wireless communication, the set of instructions comprising one or more instructions that, when executed by one or more processors of a device, cause the device to perform the method of one or more of Aspects 23-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors coupled to the one or more memories, the one or more processors individually or collectively configured to:
      transmit, to a network node at a first time, a first uplink transmission using a first transmit power that is based at least in part on:
         a first power level associated with the first uplink transmission, and
         a power scaling factor based at least in part on a power offset applied to a second uplink transmission overlapping with the first uplink transmission at the first time; and
      transmit, to the network node at the first time, the second uplink transmission using a second transmit power that is based at least in part on:
         a second power level associated with the second uplink transmission,
         a maximum available transmit power,
         the power scaling factor, and
         the first transmit power.

2. The apparatus of claim 1, wherein a total of the first power level and the second power level exceeds the maximum available transmit power, and wherein the total of the first power level and the second power level is scaled to obtain the first transmit power associated with the first uplink transmission and the second transmit power associated with the second uplink transmission.

3. The apparatus of claim 1, wherein:
   the maximum available transmit power for the UE corresponds to a total available power for the UE across frequencies over a frequency range;

the maximum available transmit power for the UE corresponds to a total available power for the UE across carriers over a frequency band; or the maximum available transmit power for the UE corresponds to a total available power for the UE across a group of frequency bands.

4. The apparatus of claim 1, wherein the one or more processors are further configured to:
receive, from the network node, an indication of the power offset, via radio resource control signaling, a medium access control control element, or downlink control information.

5. The apparatus of claim 1, wherein the power scaling factor is based at least in part on the first power level, the power offset, the second power level, and the maximum available transmit power.

6. The apparatus of claim 1, wherein the first transmit power is based at least in part on a minimum of: the first power level, and a product of the power scaling factor and the first power level.

7. The apparatus of claim 1, wherein the second transmit power is based at least in part on a minimum of: the second power level, and a difference between the maximum available transmit power and the first transmit power.

8. The apparatus of claim 1, wherein a temporary power level is based at least in part on a minimum of: the second power level, and a product of the power offset and the first power level, and wherein the power scaling factor is based at least in part on the first power level, the temporary power level, and the maximum available transmit power.

9. The apparatus of claim 1, wherein a temporary power level is based at least in part on a minimum of: the second power level, and a product of the power offset and a maximum available power for the second uplink transmission, and wherein the power scaling factor is based at least in part on the first power level, the temporary power level, and the maximum available transmit power.

10. The apparatus of claim 1, wherein the first uplink transmission is associated with a first uplink carrier and the second uplink transmission is associated with a second uplink carrier, wherein the one or more processors are further configured to:
receive, from the network node, a configuration of the power offset for the second uplink carrier, wherein the power offset is applied to the second uplink transmission associated with the second uplink carrier irrespective of a power allocation priority between the second uplink transmission and the first uplink transmission.

11. The apparatus of claim 1, wherein the one or more processors are further individually or collectively configured to:
receive, from the network node, a configuration of the power offset for an uplink carrier aggregation, wherein the power offset is applied to the second uplink transmission based at least in part on a power allocation priority between the first uplink transmission and the second uplink transmission.

12. The apparatus of claim 11, wherein the power allocation priority indicates an equal priority level between the first uplink transmission and the second uplink transmission, and wherein the power offset is applied to the second uplink transmission based at least in part on a first index associated with the first uplink transmission and a second index associated with the second uplink transmission.

13. The apparatus of claim 11, wherein the power allocation priority indicates an equal priority level between the first uplink transmission and the second uplink transmission, and wherein a smaller power offset is applied as compared to power offsets applied to uplink transmissions associated with different priority levels.

14. The apparatus of claim 1, wherein a first transmission time interval (TTI) associated with the first uplink transmission is not aligned with a second TTI associated with the second uplink transmission, wherein the power offset is applied to the second uplink transmission at a symbol level based at least in part on a (pre)-configuration, and wherein a power scaling changes during the second uplink transmission based at least in part on a power allocation priority.

15. The apparatus of claim 1, wherein a first transmission time interval (TTI) associated with the first uplink transmission is not aligned with a second TTI associated with the second uplink transmission, wherein the power offset is applied to the second uplink transmission at a slot level or at a subframe level based at least in part on a (pre)-configuration, and wherein a power scaling is fixed during a slot or subframe.

16. The apparatus of claim 1, wherein, based at least in part on a plurality of uplink transmissions including the first uplink transmission and the second uplink transmission, the power scaling factor is based at least in part on the first power level, the power offset multiplied by each of a plurality of power levels associated with the plurality of uplink transmissions, and the maximum available transmit power.

17. The apparatus of claim 1, wherein, based at least in part on a plurality of uplink transmissions including the first uplink transmission and the second uplink transmission, the power scaling factor is based at least in part on the first power level, the power offset multiplied by the first power level for each of the plurality of uplink transmissions, and the maximum available transmit power.

18. The apparatus of claim 1, wherein, based at least in part on a plurality of uplink transmissions including the first uplink transmission and the second uplink transmission, the power scaling factor is based at least in part on the first power level, the power offset multiplied by each of a plurality of maximum available powers associated with the plurality of uplink transmissions, and the maximum available transmit power.

19. The apparatus of claim 1, wherein the power offset is not applied to the first uplink transmission based at least in part on one or more of: a priority level associated with the first uplink transmission or a priority level associated with the second uplink transmission, or a first index of a first uplink carrier associated with the first uplink transmission or second index of a second uplink carrier associated with the second uplink transmission.

20. The apparatus of claim 1, wherein, for a plurality of uplink transmissions including the first uplink transmission and the second uplink transmission, a priority level is determined for each of the plurality of uplink transmissions, wherein the power offset is applied to one or more of the plurality of uplink transmissions, wherein the power offset is based at least in part on a reference uplink transmission from the plurality of uplink transmissions, and wherein the reference uplink transmission is associated with a higher priority level as compared to other uplink transmissions of the plurality of uplink transmissions.

21. An apparatus for wireless communication at a network node, comprising:
one or more memories; and
one or more processors coupled to the one or more memories, the one or more processors individually or collectively configured to:

receive, from a user equipment (UE) at a first time, a first uplink transmission using a first transmit power that is based at least in part on:
- a first power level associated with the first uplink transmission, and
- a power scaling factor based at least in part on a power offset applied to a second uplink transmission overlapping with the first uplink transmission at the first time; and receive, from the UE at the first time, the second uplink transmission using a second transmit power that is based at least in part on:
- a second power level associated with the second uplink transmission,
- a maximum available transmit power,
- the power scaling factor, and
- the first transmit power.

22. The apparatus of claim 21, wherein the maximum available transmit power for the UE corresponds to a total available power for the UE across frequencies over a frequency range.

23. The apparatus of claim 21, wherein the maximum available transmit power for the UE corresponds to a total available power for the UE across carriers over a frequency band.

24. The apparatus of claim 21, wherein the maximum available transmit power for the UE corresponds to a total available power for the UE across a group of frequency bands.

25. The apparatus of claim 21, wherein the one or more processors are further individually or collectively configured to:
transmit, to the UE, an indication of the power offset, via radio resource control signaling, a medium access control control element, or downlink control information.

26. The apparatus of claim 21, wherein the power scaling factor is based at least in part on the first power level, the power offset, the second power level, and the maximum available transmit power.

27. The apparatus of claim 21, wherein:
the first transmit power is based at least in part on a minimum of: the first power level, and a product of the power scaling factor and the first power level; and
the second transmit power is based at least in part on a minimum of: the second power level, and a difference between the maximum available transmit power and the first transmit power.

28. The apparatus of claim 21, wherein:
a temporary power level is based at least in part on a minimum of: the second power level, and a product of the power offset and the first power level; and
the power scaling factor is based at least in part on the first power level, the temporary power level, and the maximum available transmit power.

29. A method of wireless communication performed by a user equipment (UE), comprising:
transmitting, to a network node at a first time, a first uplink transmission using a first transmit power that is based at least in part on:
- a first power level associated with the first uplink transmission, and
- a power scaling factor based at least in part on a power offset applied to a second uplink transmission overlapping with the first uplink transmission at the first time; and transmitting, to the network node at the first time, the second uplink transmission using a second transmit power that is based at least in part on:
- a second power level associated with the second uplink transmission,
- a maximum available transmit power,
- the power scaling factor, and
- the first transmit power.

30. A method of wireless communication performed by a network node, comprising:
receiving, from a user equipment (UE) at a first time, a first uplink transmission using a first transmit power that is based at least in part on:
- a first power level associated with the first uplink transmission, and
- a power scaling factor based at least in part on a power offset applied to a second uplink transmission overlapping with the first uplink transmission at the first time; and receiving, from the UE at the first time, the second uplink transmission using a second transmit power that is based at least in part on:
- a second power level associated with the second uplink transmission,
- a maximum available transmit power,
- the power scaling factor, and
- the first transmit power.

* * * * *